United States Patent
Yamakawa et al.

(10) Patent No.: US 7,403,463 B2
(45) Date of Patent: Jul. 22, 2008

(54) METHOD AND APPARATUS FOR FILTERING READ SIGNAL TO THREE OR MORE CUTOFF FREQUENCIES WITH TWO OR MORE BITS CONTROL LINE THROUGHOUT THREE OR MORE CONSECUTIVE PERIODS

(75) Inventors: Hideyuki Yamakawa, Kawasaki (JP); Toshihiko Kaneshige, Yokohama (JP); You Yoshioka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 767 days.

(21) Appl. No.: 11/012,855

(22) Filed: Dec. 16, 2004

(65) Prior Publication Data

US 2005/0141370 A1 Jun. 30, 2005

(30) Foreign Application Priority Data

Dec. 26, 2003 (JP) ............................. 2003-435026

(51) Int. Cl.
*G11B 7/005* (2006.01)
*G11B 7/007* (2006.01)
*G11B 20/10* (2006.01)

(52) U.S. Cl. .................................. 369/100; 369/53.11

(58) Field of Classification Search ................. 369/100, 369/53.11
See application file for complete search history.

(56) References Cited

FOREIGN PATENT DOCUMENTS

| JP | 2000-182239 | | 6/2000 |
|---|---|---|---|
| JP | 2000-331425 | | 11/2000 |
| JP | 2001230672 | A * | 8/2001 |
| JP | 2002-123945 | | 4/2002 |
| JP | 2003-157528 | | 5/2003 |

* cited by examiner

*Primary Examiner*—Gautam R. Patel
(74) *Attorney, Agent, or Firm*—Pillsbury Winthrop Shaw Pittman, LLP

(57) ABSTRACT

An optical disk drive apparatus is provided has a reading section which reads the reflection of a laser beam from a disk to produce a read signal, a filter section which filters the read signal with the use of three or more different cutoff frequencies upon receiving a control signal from a two or more bits control line, a reproducing section which playbacks the read signal filtered by the filter, and a control section which provides the filter with the control signal along the two or more bits control line so that the filtering action with the three or more different cutoff frequencies of the filter is carried out throughout three or more consecutive periods respectively.

8 Claims, 14 Drawing Sheets

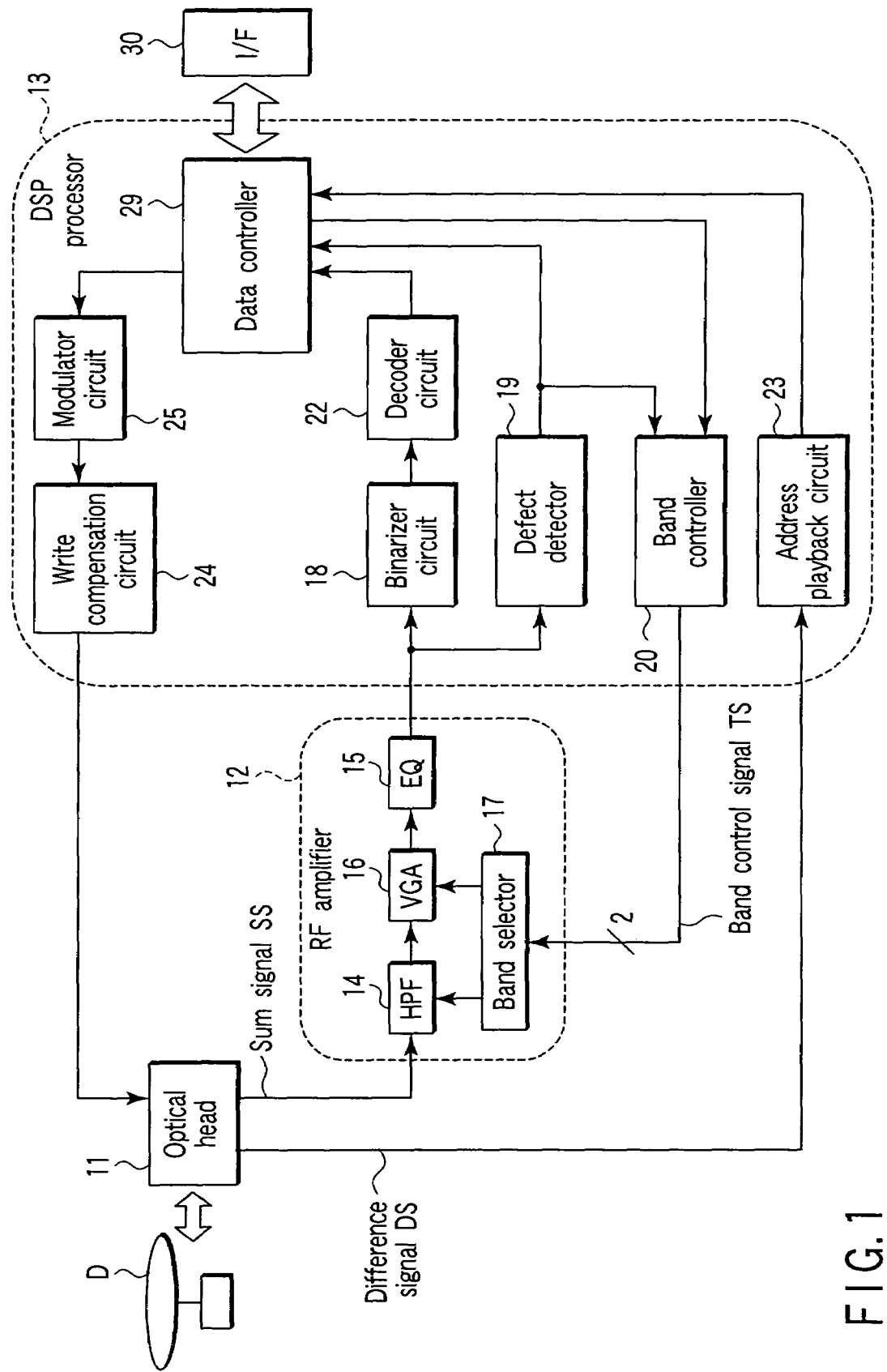
F I G. 1

METHOD AND APPARATUS FOR FILTERING READ SIGNAL TO THREE OR MORE CUTOFF FREQUENCIES WITH TWO OR MORE BITS CONTROL LINE THROUGHOUT THREE OR MORE CONSECUTIVE PERIODS

CROSS-REFERENCE TO RELATED APPLICATIONS

This application is based upon and claims the benefit of priority from prior Japanese Patent Application No. 2003-435026, filed Dec. 26, 2003, the entire contents of which are incorporated herein by reference.

BACKGROUND OF THE INVENTION

1. Field of the Invention

The present invention relates to a playback process in a disk drive apparatus and particularly to a disk drive apparatus, a disk playback method, and a disk adapted in which when the disk action is shifted from a not recorded area to a recorded area of a disk medium, its readout signal is subjected to a filtering process for minimizing the unstable period thereof.

2. Description of the Related Art

Typical recording media and record/playback apparatuses capable of recording and playing back of digital data include optical disks such as a digital versatile disk (DVD). For example, a DVD-RAM, one type of DVD, has a signal recording layer provided in its recording medium where the crystalline condition of the recording layer is modified by irradiating the signal recording layer with a laser beam having a proper energy. When irradiating the signal recording layer with a laser beam having a proper energy again, a reflected light of an amount according to the crystalline condition of the recording layer is obtained. Digital data is recorded and reproduced by detecting the reflected light. Other similar type of optical disk like DVD-RW and a DVD-R are commercially available. Also, optical disk drives employing the shorter wavelength of blue laser light have been introduced in the market. These recording media are substantially equal in the size but quite different in the detailed factors.

The signal recording layer of the recording medium has various conditions. For example, the recording layer of the optical disk consists mainly of a series of non-laser-irradiated regions (non-recorded areas) and laser-irradiated regions (recorded areas) along a track. Also, the optical disk may has a series of pits between the common recording areas.

It is not unusual during the playback operation that the DC level in the reflected light remains not stable due to the condition of the medium. If the DC level of the reflected light is significantly changed, it may cause malfunctions of the circuitry components at the subsequent stage. For compensation, some prior arts of improvement have been proposed.

In Jpn. Pat. Appln. KOKAI Publication No. 2000-182239, one of the related arts is disclosed in which the cut-off frequency of a highpass filter (HPF) is temporarily switched to another for shortening the length of the transient response.

In Jpn. Pat. Appln. KOKAI Publication No. 2000-331425, another related art is disclosed in which the cutoff frequency of a highpass filter (HPF) is temporarily increased to a high level and then decreased by small steps.

It is yet troublesome in the related art of Jpn. Pat. Appln. KOKAI Publication No. 2000-182239 that when the playback action is shifted from the non-recorded area to the recorded area, the transient response in the output signal is again attenuated to zero at one of the two cutoff frequencies but not by the other cutoff frequency immediately after the switching and may cause the downstream circuits to be functioned with difficulty.

The related art of Jpn. Pat. Appln. KOKAI Publication No. 2000-331425 also fails to eliminate completely the transient response when the playback action is varied in the speed or conducted in different formats because the sequence (speed) of declining the cutoff frequency is fixed, although the level of the transient response remains low with the cutoff frequency being declined gradually.

In addition, a further related art is disclosed for reference as Jpn. Pat. Appln. KOKAI Publication No. 2003-157528.

BRIEF SUMMARY OF THE INVENTION

One embodiment of the present invention is a disk drive apparatus comprising a reading section which reads the reflection of a laser beam from a disk to produce a read signal, a filter section which filters the read signal with the use of three or more different cutoff frequencies upon receiving a control signal from a two or more bits signal line, a reproducing section which plays back the read signal filtered by the filter, and a control section which provides the filter with the control signal along the two or more bits control line so that the filtering action with the three or more different cutoff frequencies of the filter is carried out throughout three or more consecutive periods respectively.

BRIEF DESCRIPTION OF THE SEVERAL VIEWS OF THE DRAWING

FIG. 1 is a block diagram showing an example of an arrangement of an optical disk drive apparatus according to the present invention;

DETAILED DESCRIPTION OF THE INVENTION

Figure 2:
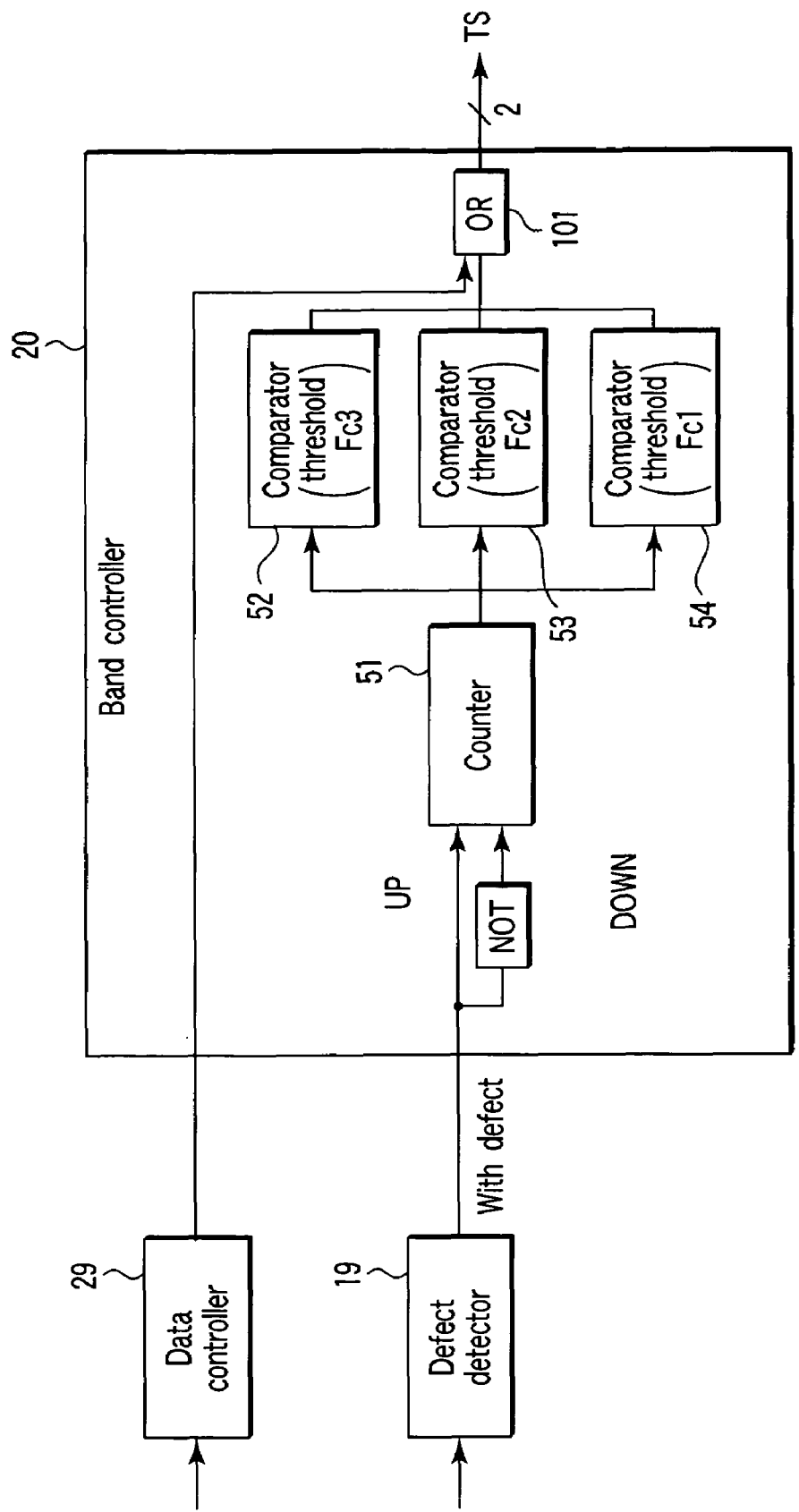
FIG. 2 is a block diagram showing an example of a band controller in the optical disk drive apparatus according to the present invention.

Some embodiments of the present invention will be described referring the relevant drawings. FIG. 1 is a block diagram showing an example of an arrangement of an optical disk drive apparatus according to the present invention. FIG. 2 is a block diagram showing an example of a band controller in the optical disk drive apparatus according to the present invention.

Figure 3:
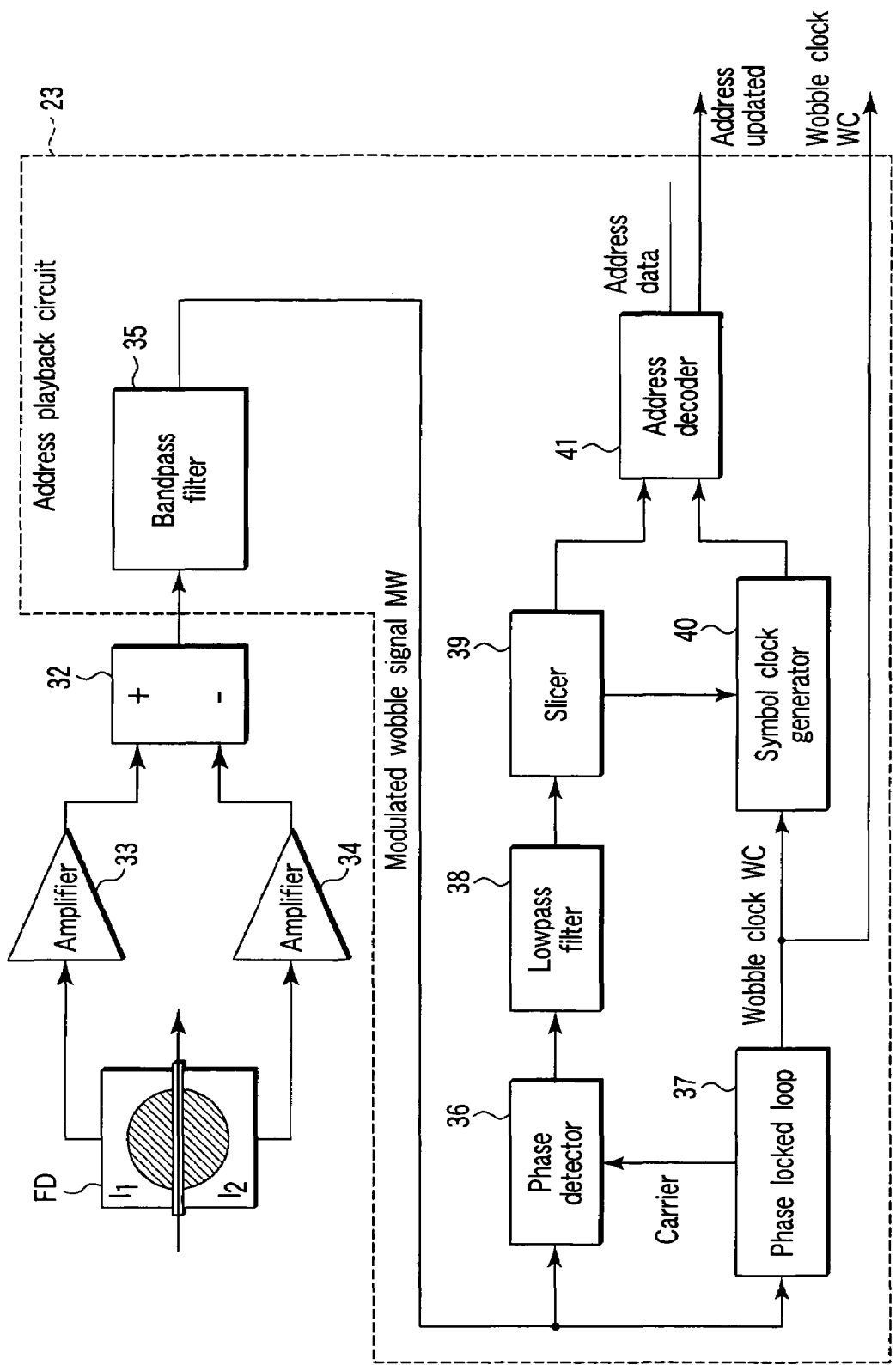
FIG. 3 is a block diagram showing an example of an arrangement of an address reproducing circuit in the optical disk drive apparatus according to the present invention.
Figure 4:
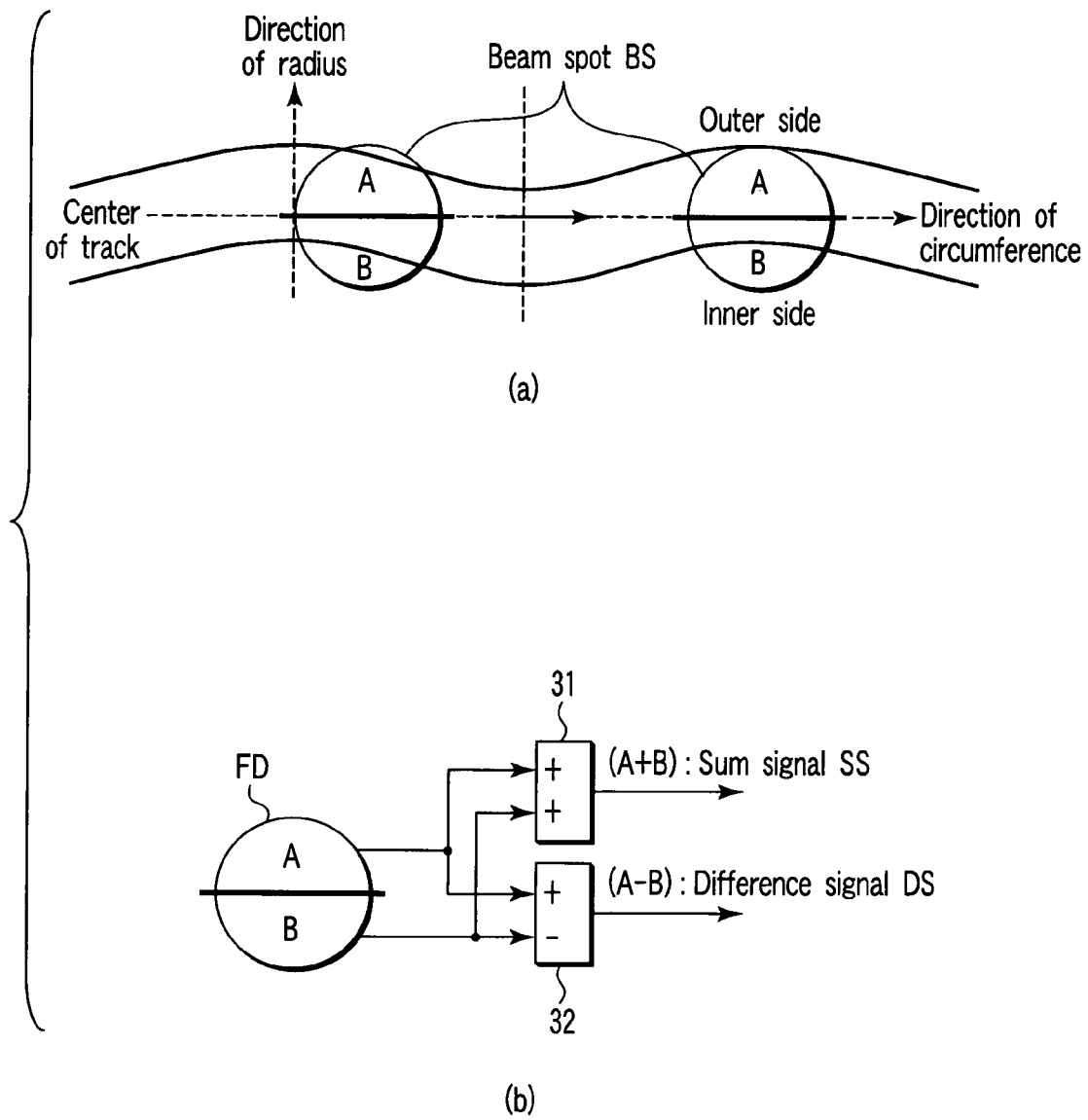
FIG. 4 illustrates a relation between track and laser beam spot on a disk.
Figure 5:
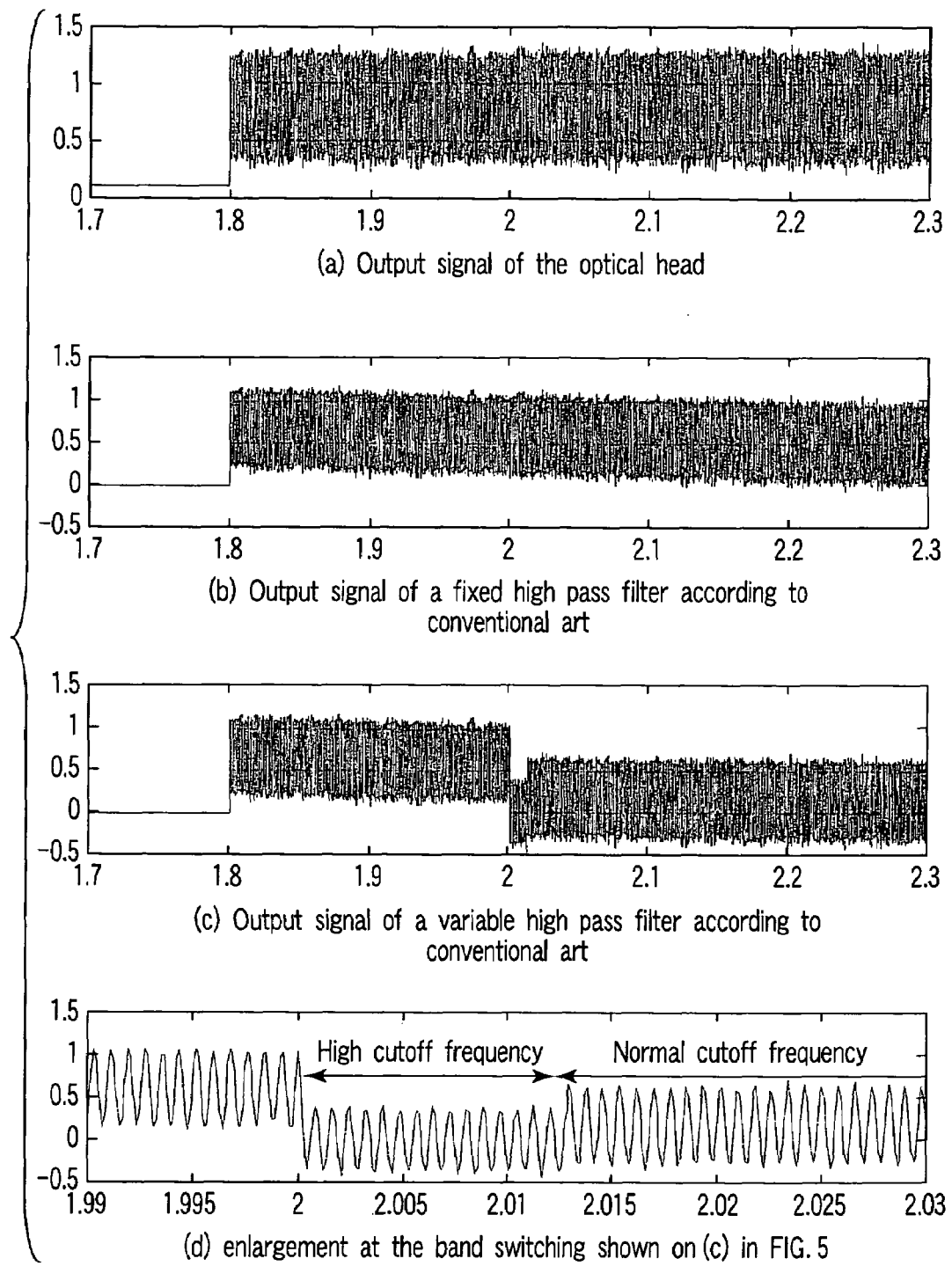
FIG. 5 illustrates an example of the action of a highpass filter in the optical disk drive apparatus according to conventional art.
Figure 6:
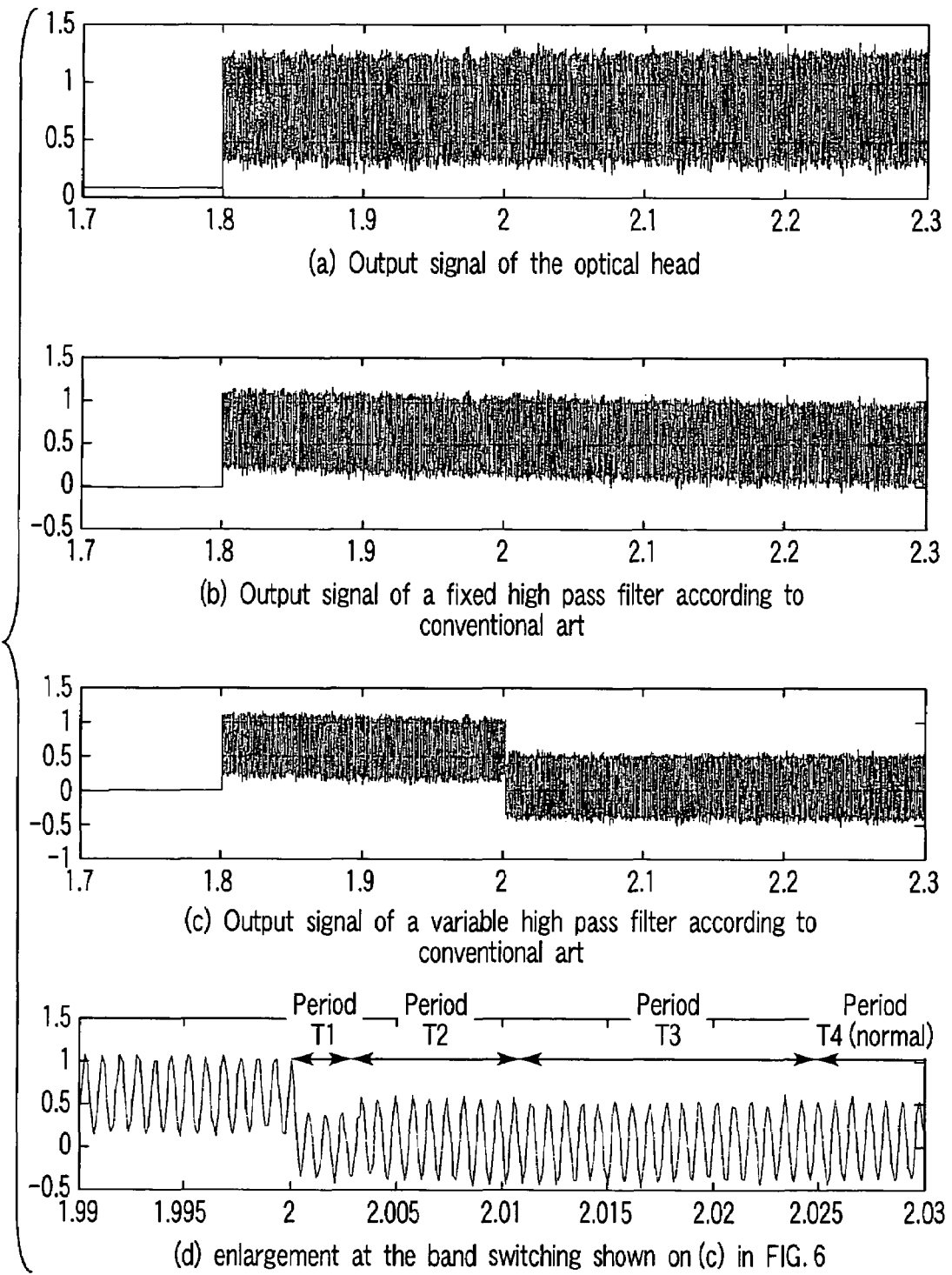
FIG. 6 is a graphic illustration showing an example of the action of the highpass filter in the optical disk drive apparatus according to the present invention.
Figure 7:
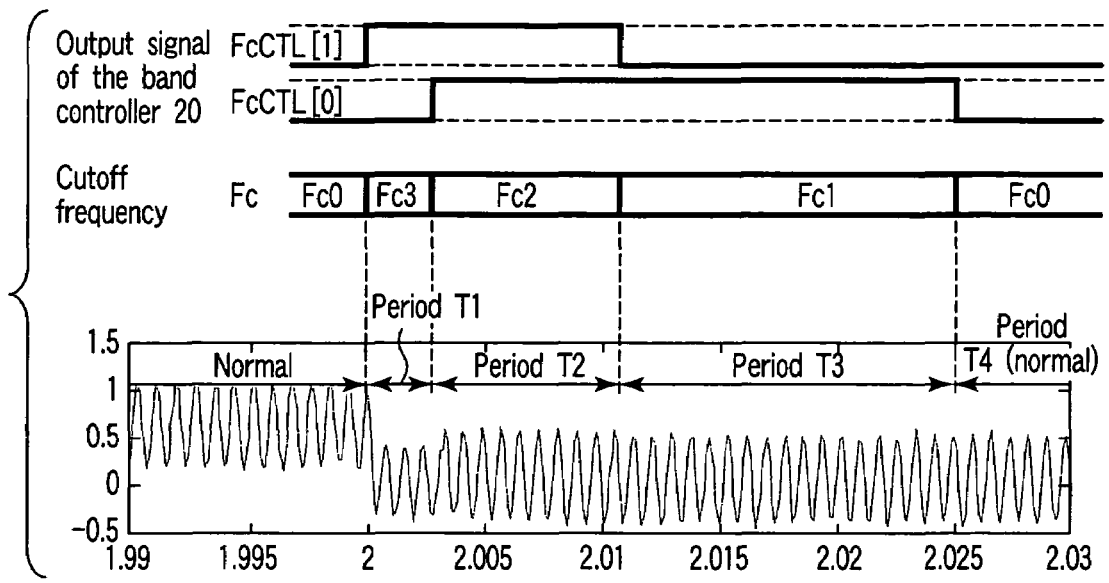
FIG. 7 illustrates an example of the relationship between the action of the highpass filter and a control signal in the optical disk drive apparatus according to the present invention.
Figure 8:
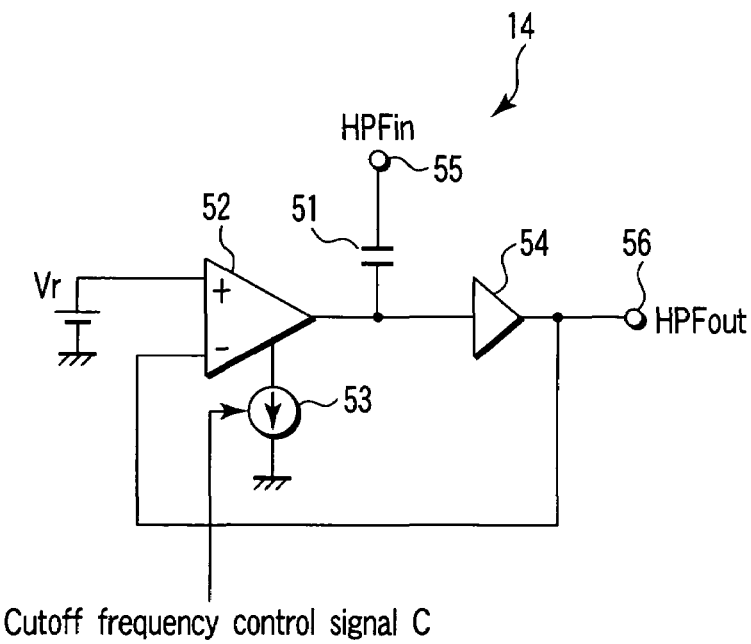
FIG. 8 illustrates an example of an arrangement of the highpass filter in the optical disk drive apparatus.
Figure 9:
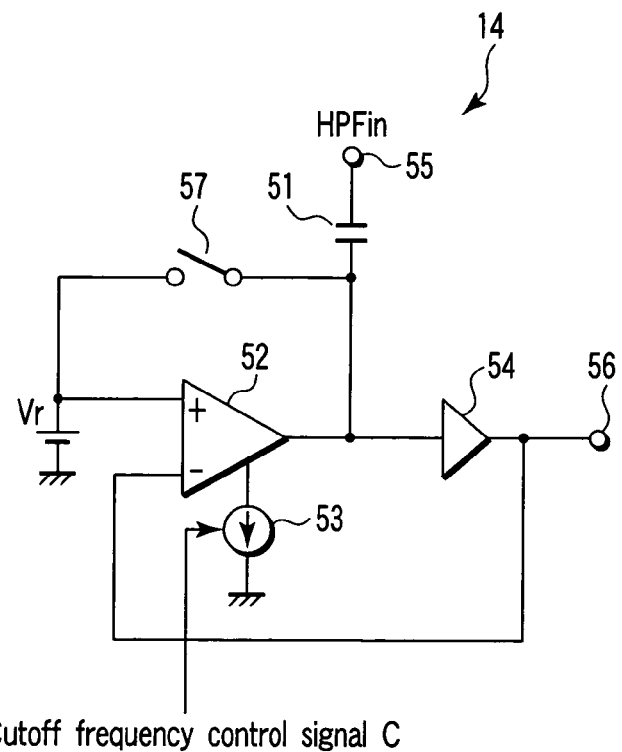
FIG. 9 illustrates a second example of an arrangement of the highpass filter in the optical disk drive apparatus.
Figure 10:
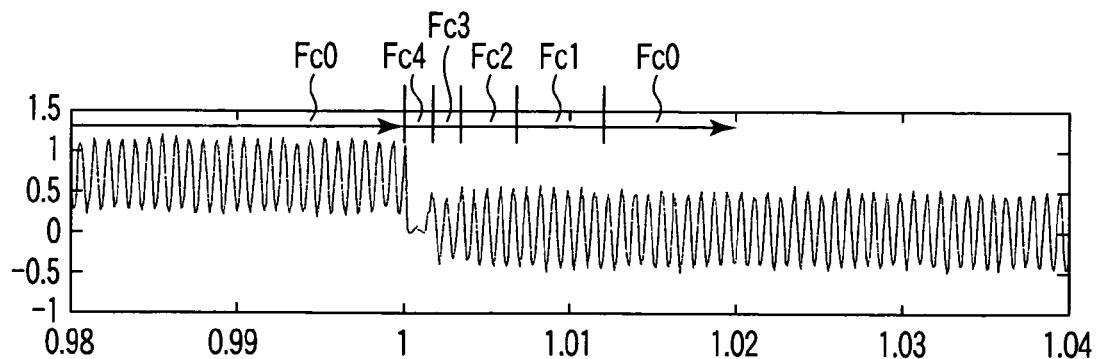
FIG. 10 illustrates an example of the action of a highpass filter in an optical disk drive apparatus according to a second embodiment of the present invention.
Figure 11:
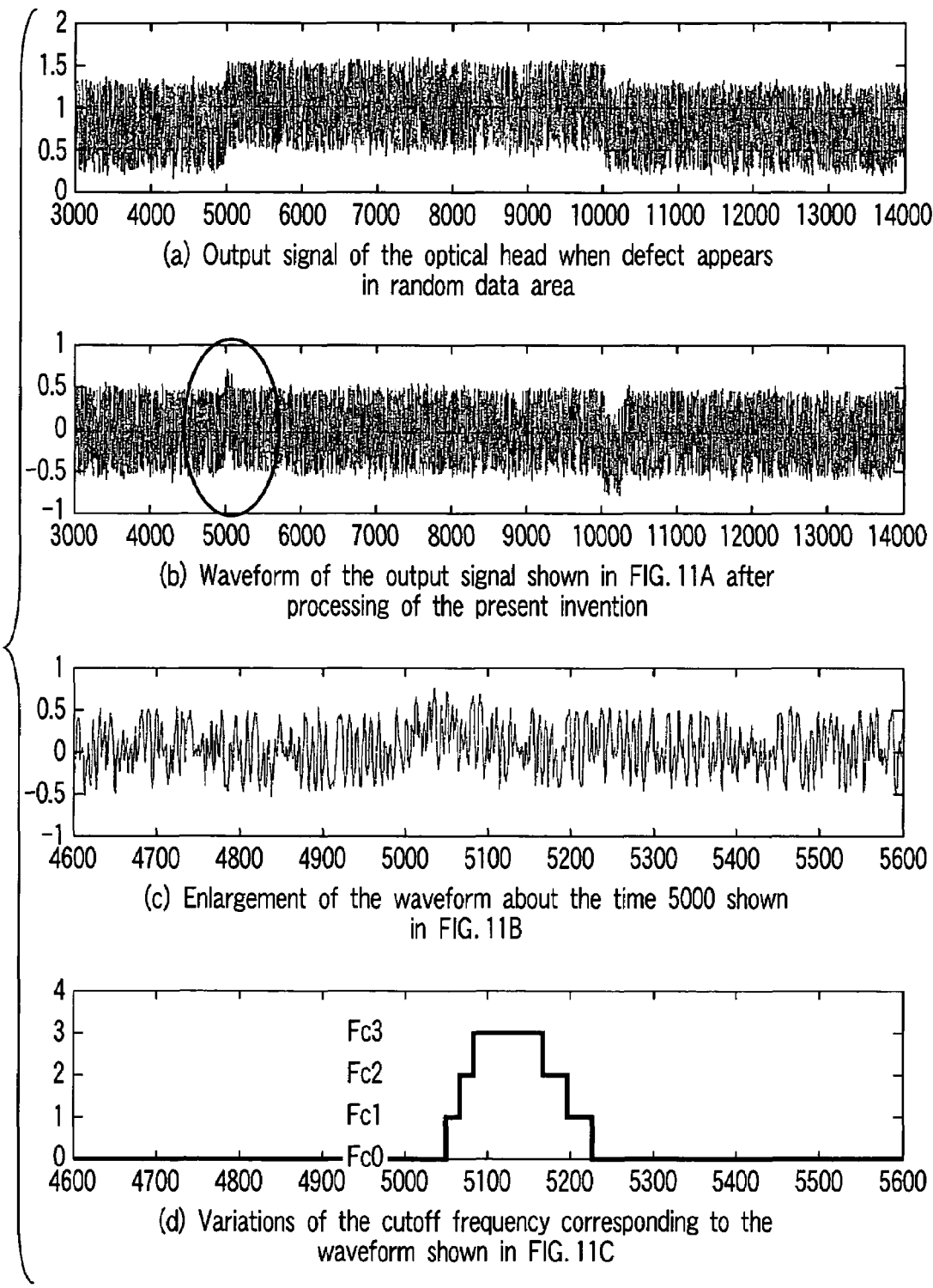
FIG. 11 illustrates an example of the action of a highpass filter in an optical disk drive apparatus according to a third embodiment of the present invention.
Figure 12:
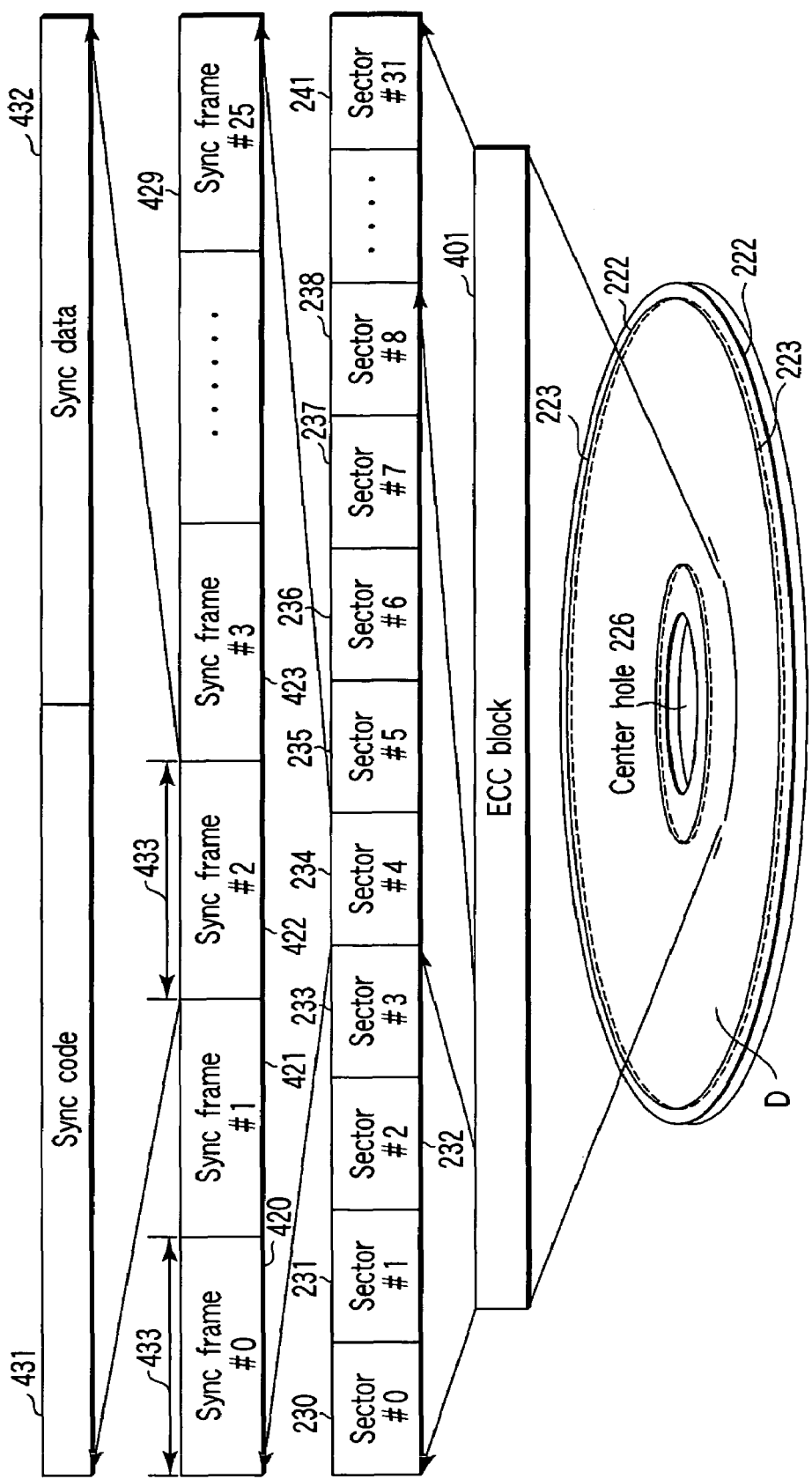
FIG. 12 illustrates a hierarchy structure of recording data on an information recording medium or disk regardless of the type (playback only, write once, or rewritable) applicable to the optical disk drive apparatus of the present invention.

FIG. 3 is a block diagram showing an example of an arrangement of an address reproducing circuit in the optical disk drive apparatus according to the present invention. FIG. 4 illustrates a relation between track and laser beam spot on a disk. FIG. 5 illustrates an example of the action of a highpass filter in the optical disk drive apparatus according to conventional art. FIG. 6 is a graphic illustration showing an example of the action of the highpass filter in the optical disk drive apparatus according to the present invention. FIG. 7 illustrates an example of the relationship between the action of the highpass filter and a control signal in the optical disk drive apparatus according to the present invention. FIG. 8 illustrates an example of an arrangement of the highpass filter in the optical disk drive apparatus. FIG. 9 illustrates a second example of an arrangement of the highpass filter in the optical disk drive apparatus. FIG. 10 illustrates an example of the action of a highpass filter in an optical disk drive apparatus according to a second embodiment of the present invention. FIG. 11 illustrates an example of the action of a highpass filter in an optical disk drive apparatus according to a third embodiment of the present invention. FIG. 12 illustrates a hierarchy structure of recording data on an information recording medium or disk regardless of the type (playback only, write once, or rewritable) applicable to the optical disk drive apparatus of the present invention.

(First Embodiment of the Optical Disk Drive Apparatus According to the Present Invention)

The present invention is intended to filter the readout signal reproduced from an optical disk throughout three consecutive periods with the use of three or more cutoff frequencies corresponding to the disk format or the speed of the playback action thus to eliminate a transient response from the readout signal which has been produced at the timing of shift from a non-recorded area to a recorded area of the disk.

(Fundamental Structure)

The disk drive apparatus according to the present invention comprises electrically an RF amplifier 12 and a DSP processor 13, shown in FIG. 1. The RF amplifier 12 operates an analog processing action while the DSP processor 13 operates a digital processing action. The disk drive apparatus has an optical head 11 provided for exposing an optical disk D driven as a recording medium by a spindle motor to a beam of laser. The laser beam from the optical head 11 is scanned for recording and reproducing of desired data. A modulator circuit 25 is provided for converting a recording data into a modulated data in accordance with predetermined rules. The modulated data is received by a write compensation circuit 24 where it is modified in the pulse width for ease of recording on a given medium.

When receiving a pulsed signal of the recording data from the write compensation circuit 24, the optical head 11 directs a laser beam of suitable energy to the optical disk D. For playback action, the optical head 11 scans the optical disk D with its laser beam of suitable energy and produces a sum signal SS as the playback signal from the reflection of the scanned laser beam.

The sum signal SS from the optical head 11 is then received by the RF amplifier 12 where it is processed by the action of a highpass filter (HPF) 14, a variable gain amplifier (VGA) 16, and an equalizer 15 before input to the DSP processor 13.

The sum signal SS contains DC components due to the principle action of the optical head 11 and is thus subjected to the filtering action with a desired cutoff frequency of the HPF 14 in the RF amplifier 12 for ease of the succeeding process. The signal is amplified by the VGA 16 so that its amplitude is substantially uniform regardless of the level of intensity of the laser beam received by the optical head 11. Then, the signal is waveform equalized by the equalizer 15.

The equalized signal is then transferred to a binarizer circuit 18 in the DSP where it is converted into a binary data consisting of "1" and "0". The construction of a binary data may be carried out using the partial response maximum likelihood (PRML) technique. The binary data is then demodulated to a recording data of the original form by a demodulator circuit 22 before transferred to a data controller 29. The data signal is then subjected to the data flow processing and the error correction processing of the data controller 29 and finally released from an I/F port 30 to the outside.

Meanwhile, a defect detector 19 is provided for examining a medium-derived defect in the output signal received from the RF amplifier 12 and transferring a result of its detection to the data controller 29 as well as a band controller 20. The data controller 29 carries out a compensating action for minimizing the effect of the defect.

The band controller 20 is designed for, upon receiving the detection signal from the defect detector 19 and the control signal from the data controller 29, generating a control signal which is then transferred via a control line of two or more digits signal to the RF amplifier 12 for controlling the filtering action of the HPF 14 with the use of three (f1, f2, and f3) or more discrete cutoff frequencies.

(A Type of the Optical Disk Applicable to the Optical Disk Drive Apparatus)

A type of the optical disk applicable to the optical disk drive apparatus according to the present invention will be described referring the relevant drawings. The optical disk applicable to the optical disk drive apparatus according to the present invention has a hierarchy structure of the recording data as shown in FIG. 12 regardless of its type (playback only, write once, or rewritable).

More specifically, an ECC block 401 which is a maximum unit for the error detection or error correction consists of 32 sectors 230 to 241. Each of the sectors 230 to 241 includes 26 sync frames 420(#0) to 429(#25). The sync frame comprises a sync code 431 and a sync data 432 as shown in FIG. 12. The sync frame carries 1116 (=24+1092) channel bits. The sync frame length 433 defined as a physical length on the optical disk D is uniform for carrying one sync frame (except a change in the physical distance due to synchronization in the zone).

It is noted that the area in one ECC block 412(#2) consisting of 32 sectors shown in FIG. 12 is called as a data area 470 hereinafter in the description of the embodiment.

Figure 13:
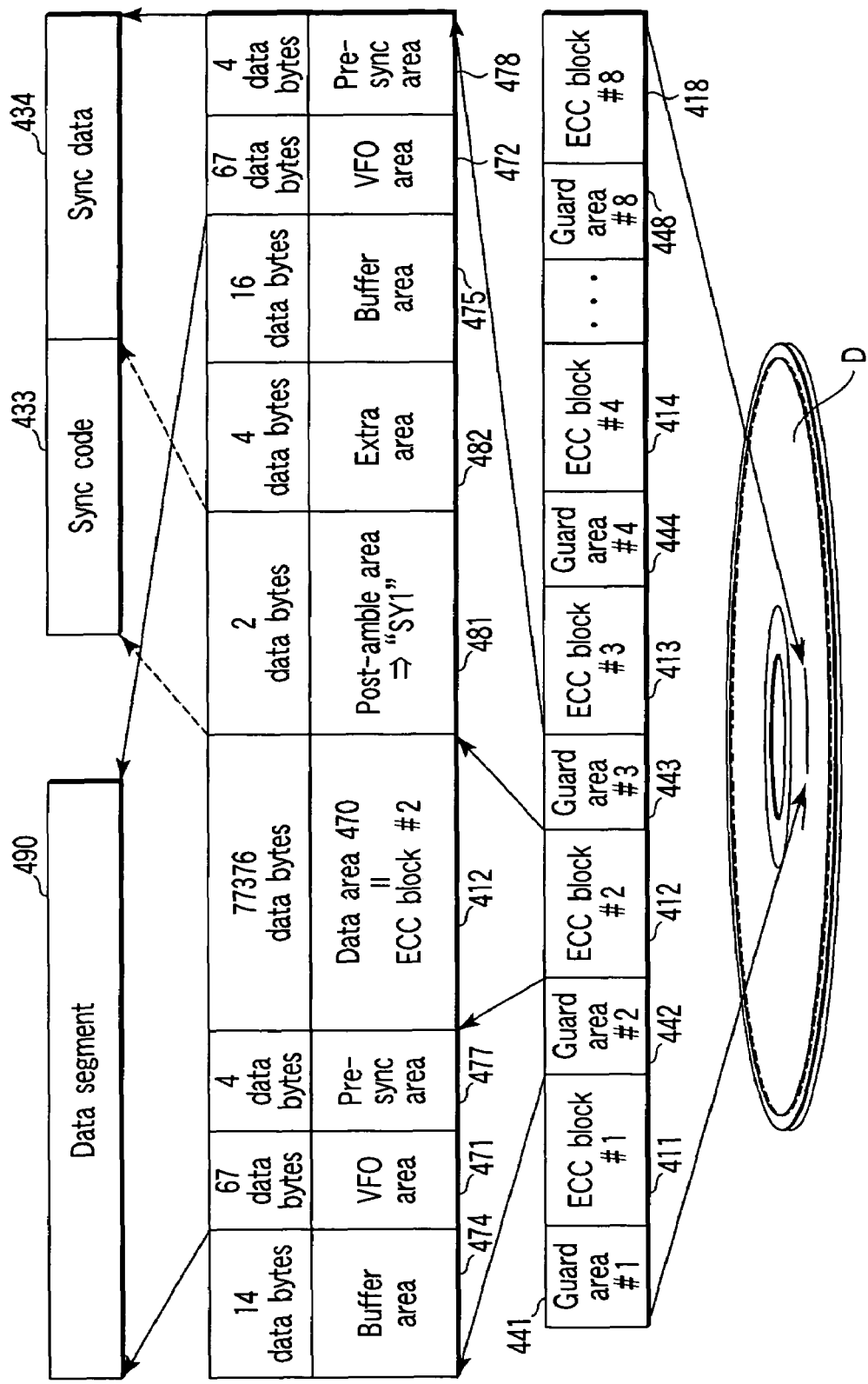
FIG. 13 illustrates details of the guard areas on an optical recording disk applicable to the optical disk drive apparatus of the present invention.

FIG. 13 illustrates two VFO (variable frequency oscillator) areas 471 and 472 provided for synchronization of the reference clock in a data playback or record/playback apparatus for reproducing data from the data area 470. The content data carried in the two areas 471 and 472 is a succession of "7Eh"s prior to the modulation, which will be explained later. After the modulation, the data will be patterns of channel bits, i.e., "010001 000100" is repeated (having three consecutive zeros inserted repeatedly). It is essential for carrying the pattern that the first byte in the VFO areas 471 and 472 is set to State 2 at the modulation.

Each pre-sync area 477 or 478 is provided between the VFO area 471 or 472 and the data area 470 and in which a pattern of "100000 100000" is repeated (having five consecutive zeros inserted repeatedly). In the action of the data playback or record/playback apparatus, the shift from the patterns of "010001 000100" in the VFO area 471 or 472 to the patterns of "100000 100000" in the pre-sync area 477 or 478 is detected to indicate that the data area 470 follows immediately.

A post-amble area 481 is provided for indicating both the end of the data area 470 and the start of a guard area 443. The pattern of channel bits in the post-amble 481 is identical to a pattern SY1 in the sync code shown in FIG. 13.

An extra area 482 is provided for controlling the copying action and inhibiting any unauthorized copying. In particular, the extra area may be filled with zeros of the channel bits when neither the controlling of the copying action nor the inhibition of the unauthorized copying is needed.

A buffer area like the VFO areas 471 and 472 carries repeats of "7Eh" prior to the modulation, i.e., a pattern of "010001 000100" is repeated (having three consecutive zeros inserted repeatedly). It is also essential for carrying the pattern that the first byte in the VFO areas 471 and 472 is set to State 2 at the modulation.

As shown in FIG. 13, the post-amble area 481 carrying patterns of SY1 represents the sync code 433 while a row of the extra area 482 to the pre-sync area 478 represents the sync data area 434. Also, a series of areas from the VFO area 471 to the buffer area 475 (including the data area 470 and portions of its two, front and rear, guard areas) is termed a data segment 490 in this embodiment which is different from a physical segment as will be explained later. The size of each data shown in FIG. 13 is expressed by the number of bytes prior to the modulation.

(Wobble Address Format Allocation on the Rewritable Recording Medium)

Explanation of Physical Segment Format

The method of recording address data with the use of wobble modulation on a recordable recording medium applicable to the optical disk drive apparatus of the present invention will be described referring to FIG. 14. The method of setting address data with the wobble modulation is featured by allocation in units of the length of the sync frame 433 shown in FIG. 12. One sector consists of 26 sync frames and one ECC block consists of 32 sectors. Then, one ECC block includes 226×32=83 sync frames. The length of each of the guard areas 462 to 468 between the ECC blocks 411 and 418 corresponds to one sync frame length 433. Accordingly, a sum of one ECC block 411 and one guard area 462 is equal to 832+1=833 of the sync frames. The factorization in prime factors is thus expressed by

833=7×17×7.

This can be assigned to the structural arrangement. More particularly as shown on (b) in FIG. 14, the sum of one ECC block and one guard area is defined as a data segment 531 or a fundamental rewritable data unit (which is identical in the structure to the data segment for a playback specified data medium shown in FIG. 13 as will be explained later in more detail). As shown, the area which is identical in the physical length to the data segment 531 is divided into seven physical segments 550(#0) to 556(#6). Each of the physical segments 550(#0) to 556(#6) is assigned with a wobble address data 610 which has been wobble modulated. As shown in FIG. 14, the data segment 531 is not matched at one end with but is lagged from the physical segment 550 by a length which will be explained later. Also, each of the physical segments 550(#0) to 556(#6) consists of 17 wobble data units (WDU) 560(#0) to 576(#16) (See (c) in FIG. 14). Each of the wobble data units 560(#0) to 576(#16) is equal to seven sync frames. Each of the wobble data units 560(#0) to 576(#16) consists of 16 wobbles of the modulated area and 68 wobbles of the non-modulated area 590 and 591. As featured in the present invention, the non-modulated area 590 and 591 is much greater in the size of occupation than the modulated area. As the non-modulated area 590 and 591 has grooves or lands wobbled at a constant frequency, they allows the reference clock signal used for the playback action or the recording action on the recording medium to be stably extracted (generated) through the action of phase locked loop.

Since the non-modulated area 590 and 591 is set greater in the size than the modulated area, the extraction (generation) of the reference signal for the playback action or the recording action can significantly be improved in both the accuracy and the stability. At the timing of shifting from the non-modulated area 590 and 591 to the modulated area, a modulation start mark 581 and 582 of 4 wobbles is provided. The modulation start mark 581 and 582 is followed by the wobble address area 586 and 587 which has been wobble modulated. For ease of the extraction of the wobble address data 610, the wobble sync area 580 in each of the wobble segments 560(#0) to 576(#16) excluding the non-modulated area 590 and 591 and the modulation start mark 581 and 582 is rearranged with the wobble address area 586 and 587 as shown on (d) and (e) in FIG. 14. With the modulation of 180 degrees in phase conducted by an NRZ (non return to zero) technique, the phase of the wobble, when the phase at the wobble is zero degree or 180 degrees, the address bit (of address symbol) is turned to "0" and "1" respectively.

Figure 14:
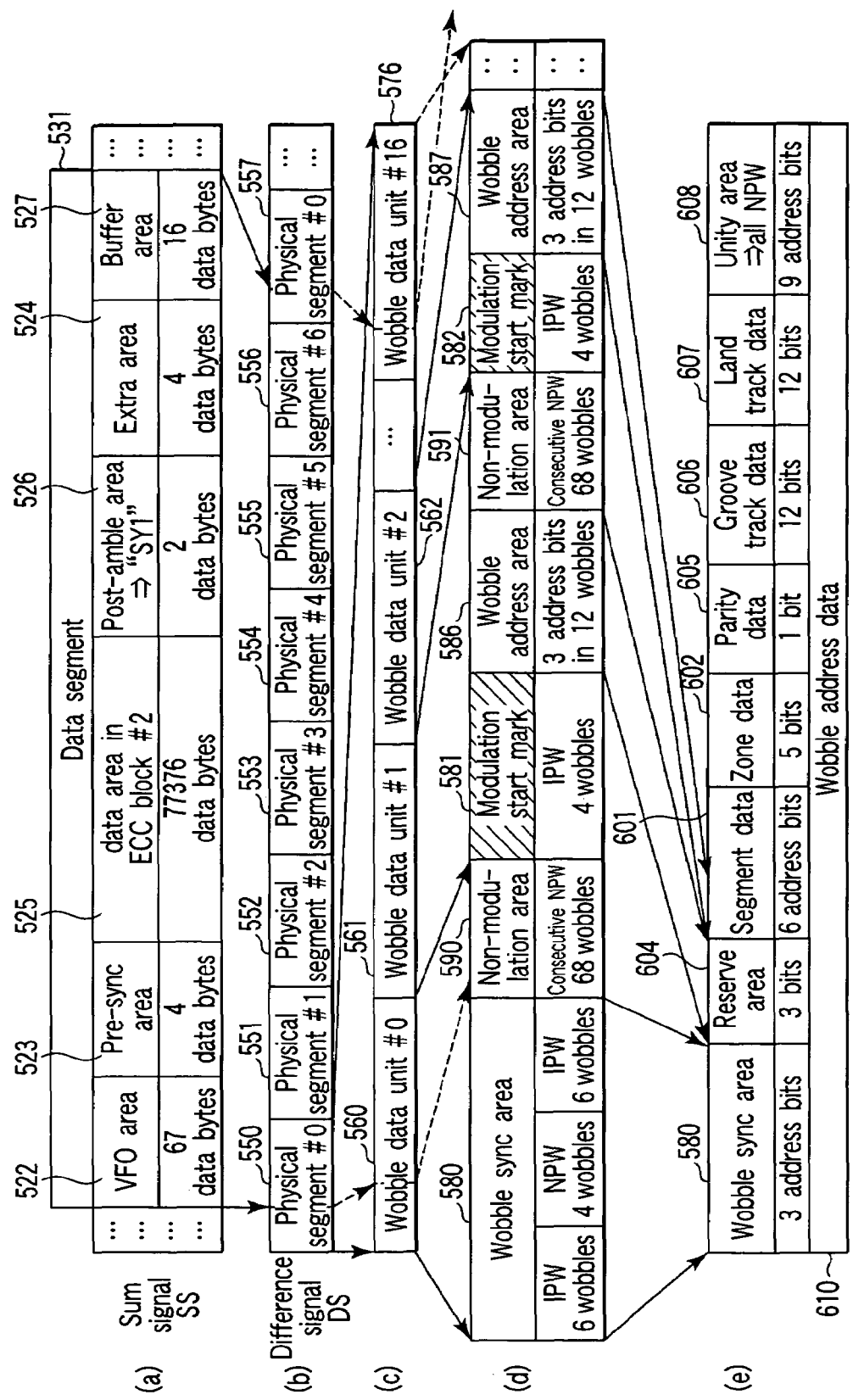
FIG. 14 illustrates an arrangement of the wobble address format on an optical recording disk applicable to the optical disk drive apparatus of the present invention.

As apparent from (d) in FIG. 14, the wobble address area 586 and 587 assigns 3 address bits to 12 wobbles. More specifically, 4 consecutive wobbles represent one address bit. Since the NRZ technique is used, any 4 consecutive wobbles in the wobble address area 586 and 587 remain unchanged in the phase. This advantage is utilized to determine the pattern of wobbles in the wobble sync area 580 as well as in the modulation start mark 561 and 582. In other words, the wobble sync area 580 and the modulation start mark 561 and 582 are assigned with wobble patterns which are never encountered in the wobble address area 586 and 587 and can thus be identified with much ease. Particularly while the wobble address area 586 and 587 has 4 consecutive wobbles composed of one address bit, the wobble sync area 580 in the embodiment sets the length of one address bit to other than the length of 4 wobbles. More specifically, since the start portion at the wobble bit of "1" in its first wobble sync area 580 is assigned with 6 wobbles but not 4 wobble and simultaneously the modulation area (16 wobbles) in the wobble data unit 560(#0) is allocated to its wobble sync area 580, the wobble address data 610 can successfully be facilitated in the detection of its start end (at the location of the wobble sync area 580).

The wobble address data 610 includes the following items.

1. Track Data 606, 607

A group track data 606 which means track number in the zone and identifying the address at the grooves (which includes no undefined bits but undefined bits are produced on the lands) and a land track data 607 for identifying the address at the lands (which include no undefined bits but undefined bits are produced on the grooves) are alternately recorded. The track number is written in the form of gray codes or specific track codes in the track data 606 and 607.

2. Segment Data 601

This data indicates the segment number in the track (one full circle on the optical disk D). When the segments are numbered from "0", the segment address data 601 expresses a bit pattern of "000000" where 6 bit "0" are consecutively rowed. This may disturb the detection of the boundary (denoted by the black triangle) of the address bit area 511 and generate a bit shift where the boundary of the address bit area 511 is detected at a shifted location. Accordingly, the bit shift will result in misjudgment of the wobble address data. For avoiding such a trouble, the segments are numbered from "000001".

3. Zone Identification Data 602

This data indicates the zone number on the optical disk D expressed by "n" of the zone (n).

4. Parity Data 605

This is provided for error detection during the reproducing from the wobble address data 610. As 17 address bits have been summed from the segment data 601 to the reserve data 604, the parity is "0" when the sum is an even number and "1" when the sum is an odd number.

5. Unity Area 608

As described, each of the wobble data units 560(#0) to 576(#16) consists of the modulation area of 16 wobbles and the non-modulation area 590 and 591 of 68 wobbles where the non-modulation area 590 and 591 is much greater in the size of occupation than the modulation area. Also, as the non-modulation area 590 and 591 is increased in the size, the reference clock signal for the playback action or the recording action is improved in the accuracy and the stability of the extraction (generation). The unity area 608 shown on (e) in FIG. 14 corresponds to a combination of the wobble data unit 576(#16) shown on (c) in FIG. 14 and its preceding wobble data unit (#15) not shown. When a monotone data 608 is carried, all the 6 address bits are "0". Accordingly, the wobble data unit 576(#16) including the monotone data 608 and its preceding wobble data unit (#15) not shown include non of the modulation start mark 581 and 582 but the non-modulation areas at the uniform phase.

The data structure shown in FIG. 14 will now be explained in more detail.

The data segment 531 includes a rewritable data area 525 of 77376 bytes. The length of the data segment 531 is normally 77469 bytes. The data segment 531 consists of a VFO area 522 of 67 bytes, a pre-sync area 523 of 4 bytes, the data area 525 of 77376 bytes, a post-amble area 526 of 2 bytes, an extra (reserve) area 524 of 4 bytes, and a buffer area field 527 of 16 bytes. The layout of the data segment 531 is shown on (a) in FIG. 14.

The data of VFO area 522 is set with "7Eh". The modulation state is denoted by State 2 at the first byte in the VFO area 522. The modulation pattern in the VFO area 522 is repeats of the following pattern.

"010001 000100"

The post-amble area 526 is recorded in the sync code SY1.

The extra area 524 is a reserved area where all the bits are "0b"s.

The data of buffer area 527 is also set with "7Eh". The modulation state of the first byte in the buffer area 527 depends on the last byte in the reserve area. The modulation pattern in the buffer area excluding the first byte is following pattern.

"010001 000100"

The data saved in the data area 525 is called data frames, scrambled frames, record frames, or physical sector depending on the level in the signal processing. The data frame consists of a main data of 2048 bytes, a data ID of 4 bytes, an ID error detection code (IED) of 2 bytes, a reverse data of 6 bytes, and an error detection code (EDC) of 4 bytes. The main data of 2048 bytes in the data frames is combined with an EDC scrambled data to be a scrambled frame. 32 of the scrambled frames in the ECC block are assigned with cross read-solomon error correction codes.

The record frame is ECC encoded and then added with an outer symbol (PO) and an inner symbol (PI) to be a scrambled frame. Each ECC block including the 32 scrambled frames is assigned with PO and PI.

The record frame of 91 bytes is subjected to ETM processing where a sync code is added to its head, whereby the record data area is turned to a record frame. Each data area consists of 32 physical sectors.

(Recording/Rewriting Method on the Optical Disk in the Optical Disk Drive Apparatus of the Invention)

Figure 15:
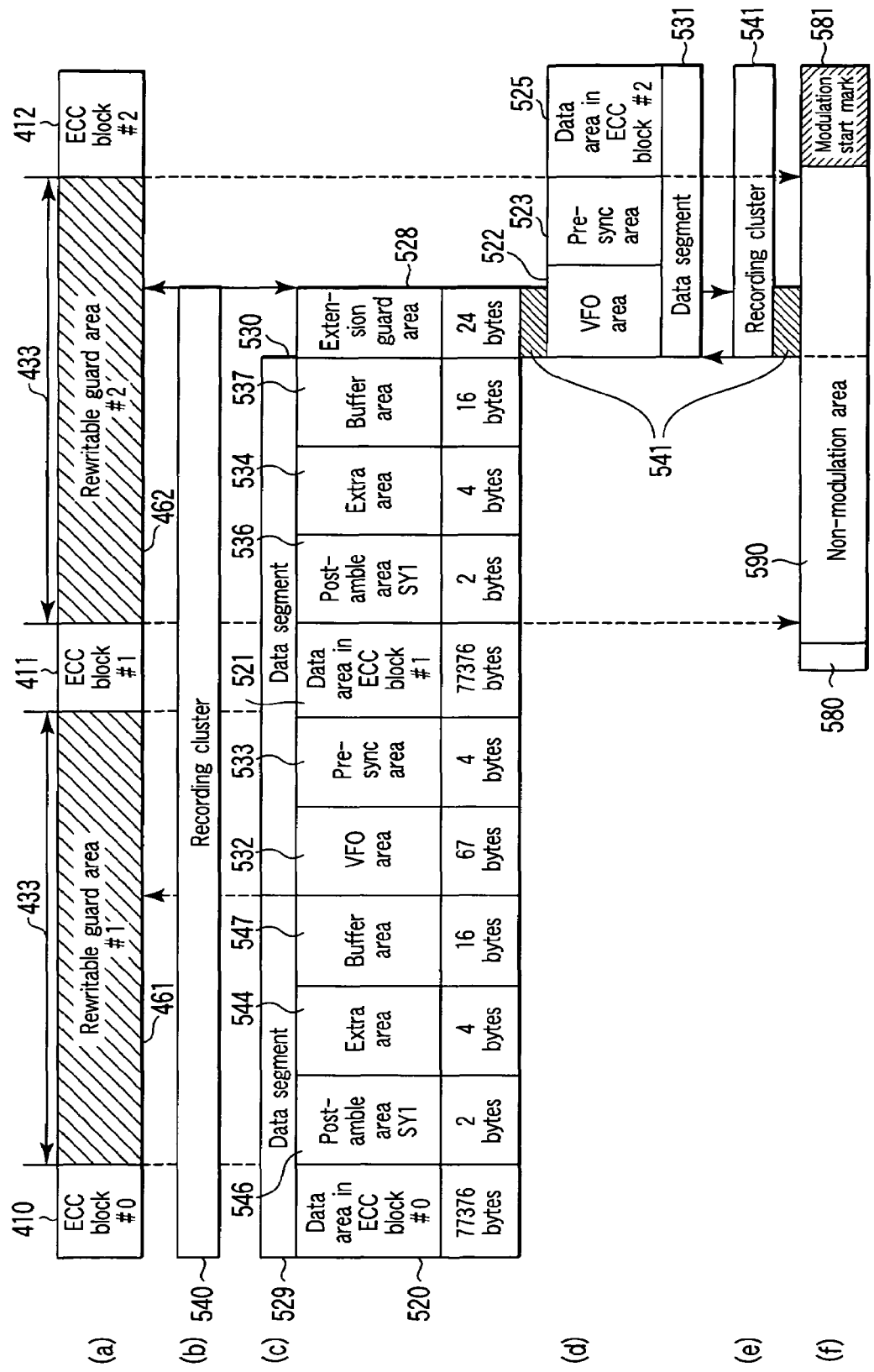
FIG. 15 illustrates a data recording method of recording rewritable data on a rewritable optical disk applicable to the optical disk drive apparatus of the present invention.

FIG. 15 illustrates a recording format of rewritable data on a rewritable data recording medium. The rewriting of rewritable data is carried out in units of a recording cluster 540 or 541 shown on (b) and (e) in FIG. 15. The recording cluster consists of one or more data segments 529 to 531 and an extension guard area 528 at the end. More particularly, the recording cluster 531 starts with the VFO area 522 as its start corresponds to the start of the data segment 531. For example, when a plurality of data segments 529 and 530 are saved in a succession, they are allocated in a row in the recording cluster 531 as shown on (b) and (c) in FIG. 15. At the time, as the buffer area 547 of the data segment 529 is joined continuously to the VFO area 532 of the second data segment, two are matched in the phase of the reference clock signal for the recording action. After the continuous recording, the extension guard area 528 is allocated at the end of the recording cluster 540. The extension guard area 528 has a size of 24 data bytes before the modulation.

As apparent from (a) and (c) in FIG. 15, the post-amble areas 546 and 536, the extra areas 544 and 534, the buffer areas 547 and 537, the VFO areas 532 and 522, and the pre-sync areas 533 and 523 are saved in the rewritable guard areas 461 and 462 while the extension guard area 528 is allocated at the end of the continuous records.

The arrangement of data for inserting the guard area between the ECC blocks is common between the playback only type and the write once type and the rewritable type of the recording mediums. As apparent from FIG. 13 and (a) in FIG. 14, the arrangement of data in the data segments 490 and 531 is common between the playback only type, the write once type, and the rewritable type of the recording mediums. The contents of data in the ECC blocks 411 and 412 is also identical regardless of the type of the recording medium, where the data of 77376 data bytes (prior to the modulation) can be recorded. More specifically, the rewritable data 525 in the ECC block #2 consists of 26 sync frames.

For comparison of the physical range in each rewritable unit, (c) in FIG. 15 illustrates a portion of the recording cluster 540 as one rewritable unit and (d) in FIG. 15 illustrates a portion of the recording cluster 541 as the succeeding rewritable unit. It is specified (representing the inventive feature I) that the extension guard area 528 in the data segment 530 and the VFO area 522 in the succeeding data segment 531 are partially overlapped at the overlap area 541 in the rewriting action. The overlap rewriting can eliminate a crosstalk between the layers in the recording medium which has two layers at one side thereof.

The recording clusters 540 and 541 are allocated in the data lead-in area, the data area, and the data lead-out area.

The recording cluster 540 or 541 includes at least one or more of the data segments 529 and 530 and the extension guard area 528. The length of the data segment 529 or 530 is equal to that of seven physical segments. At each recording action, one recording cluster 540 or 541 is constructed.

The data segments in the land track includes no gaps. The data segments in the groove track also includes no gaps. The number of the start physical segment in the data segment is expressed by {(the number of physical segments in each track)×
(track number)+(physical segment number)
}$mod 7=0$.

"A mod B" is a remainder after dividing A by B.

This means that the recording action starts at the location of a multiple of 7 for the physical segments.

The data of extension guard area 528 is set with "7Eh" where the modulation pattern is repeats of the following pattern.

"010001 000100"

The start of the recording cluster is then dislocated by ±1 byte from its theoretical start location spaced by 24 wobbles from the start of the physical segment. The theoretical start location is equal to the start of NPW (See FIG. 16).

Figure 16:
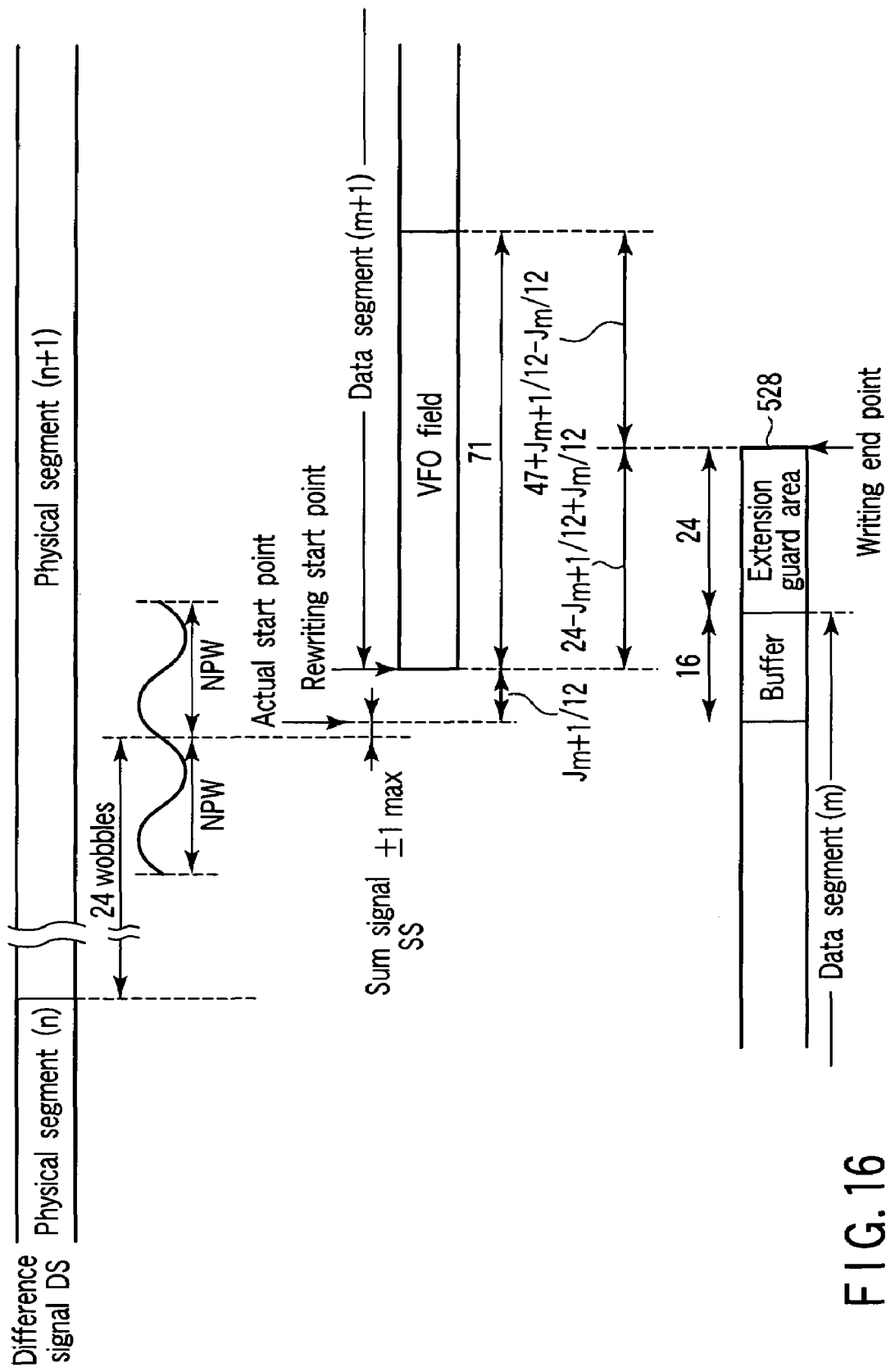
FIG. 16 illustrates a layout of linking in the optical disk drive apparatus of the present invention.

The start of the recording cluster is shifted from the actual start position by J/12 bytes in order to uniform the mark on the recording layer and the average ratio of the location of the space after a plurality of rewrite cycle (See FIG. 16).

The figure in FIG. 16 represents a length of bytes. $J_m$ varies at random from 0 to 167 while $J_{m+1}$ varies at random from 0 to 167.

As apparent from (a) in FIG. 14, the size of rewritable data in one data segment is calculated from 64+4+77376+2+4+16=77469 data bytes.

Also, as apparent from (c) and (d) in FIG. 14, one wobble data unit 560 consists of 6+4+6+68=84 wobbles.

Since 17 wobble data units form one of the physical segment 550 and 7 physical segments 550 to 556 are equal in the length to one data segment 531, the length of one data segment 531 contains 84×17×7=9996 wobbles.

Accordingly, the bytes per wobble is expressed by 77496.9996=7.75 data bytes/wobble As shown in FIG. 16, the extension guard area 528 overlaps the VFO area 522 after 24 wobbles from the head of the physical segment. While the wobble area 580 ends with 16 wobbles from the head of the physical segment 550, the remaining of 68 wobbles is allocated within the non-modulation area 590 as apparent from (d) in FIG. 14. Accordingly, the extension guard area 528 overlaps 24 wobbles of the VFO area 522 in the non-modulation area 590.

The recording layers in the rewritable recording medium are implemented by phase modulation type layers. The phase modulation type layer starts being degraded in the proximity of the start or end of the rewriting location. Hence, in case that the start and end of the recording action is repeated at the same location, the number of the rewriting actions has to limited due to the degradation of the recording layers. For compensation, the rewriting action is dislocated by $J_{m+1}/12$ data bytes to change the start location of the recording at random, as shown in FIG. 16.

In (c) and (d) in FIG. 14, the start of the extension guard area 528 and the start of the VFO area 522 are matched with each other for ease of the description of the fundamental concept. Strictly speaking, the start of the VFO area 522 is randomly lagged as shown in FIG. 16.

On a DVD-RAM disk as the currently available rewritable recording medium, the recording layers are of phase modulation type and its recording start and end locations are dislocated at random for improving the number of the rewriting actions. The dislocation for the DVD-RAM disk is set to 8 data bytes at maximum. Also, the channel bit length (of data saved after the modulation) on the DVD-RAM disk is set with an average of 0.143 μm. The average length of the channel bits is (0.087+0.093)÷2=0.090 μm The physical dislocation on the DVD-RAM disk is then calculated as a random range from 8 bytes×(0.143 μm÷0.090 μm)=12.7 bytes.

For ease of the detection of playback signal, the random dislocation is matched with the channel bits after the modulation. Since the modulation is carried out by an ETM (eight to twelve modulation) technique for converting an 8-bit format to a 12-bit format, the random dislocation is expressed by $J_m/12$ data bytes.

As 12.7×12=152.4 is established, $J_m$ ranges from 0 to 152. Accordingly, the random dislocation matches the currently available DVD-RAM, the same number of the rewriting actions can be endured as that of the DVD-RAM. In this embodiment, the number of the rewriting actions is allowed to have a margin and expressed by Random dislocation=14 data bytes.

Hence, $J_m$ ranges from 0 to 167.

As shown in FIG. 15, the buffer area 547 and the VFO area 532 are equal in the length in the recording cluster 540. All the data segments 529 and 530 in the recording cluster 540 are uniform in the random dislocation $J_m$. For recording one recording cluster 540 consisting of multiple data segments, its recording location is monitored from wobbles. More specifically, the recording location on the data recording medium is identified and saved at the same time when the number of wobbles in the non-modulation areas 590 and 591 is calculated and the location of the wobble sync area 580 is detected as shown in FIG. 14. At the time, a change in the rotation of a rotating motor for driving the recording medium or a counting error of the wobbles may probably cause the wobble slip (recording with a shift of one wobble period), thus dislocating the recording position on the recording medium.

It is also featured in this embodiment that when the dislocation of the recording position is detected on the recording medium, it can readily be corrected by modifying the rewritable guard area 461 shown in FIG. 15. While the post-amble area 546, the extra area 544, and the pre-sync area 533 shown in FIG. 15 carry important informations which permit neither bit loss nor bit overlap, the buffer area 547 and the VFO area 532 have repeats of patterned bits whereby some bit loss or bit overlap may be accepted in a single pattern of bits so long as the pattern is repeated. Accordingly, the buffer area 547 or the VFO area 532 in the guard area 461 can favorably be used for modifying the timing of the recording action.

As shown in FIG. 16, the start of the action at the reference point of the allocation of data is matched with the (center) location at "0" of a wobble amplitude. However, since the wobble detection of the position is rather low in the accuracy, the actual start point is determined, as denoted by "±1 max" in FIG. 16, within a range of ±1 data byte at maximum.

It is now assumed as shown in FIGS. 15 and 16 that the random shift in the data segment 530 is $J_m$ (as all the data segments 529 in the recording cluster 540 are equal in the random shift) and the random shift amount in the data segment 531 which is written succeedingly is $J_{m+1}$. $J_m$ and $J_{m+1}$ may be mean values as $J_m = J_{m+1} = 84$, When the actual start point is initiated high in the accuracy, the start of the extension guard area 528 is equal to the start of the VFO area 522 as shown in FIG. 15.

On the other hand, when the data segment 530 is saved at the maximum of the allowance range and the succeeding data segment 531 is saved at the minimum of the range, the head of the VFO area 522 may step into the buffer area 537 by 15 data bytes at the maximum. The extra area 534 preceding the buffer area 537 carries important informations. It is hence needed to set the length of the buffer area 537 to 15 data bytes or more. The buffer area 527 shown in FIG. 15 is set with 16 data bytes where a margin of one data byte is given.

When a gap is created between the extension guard area 528 and the VFO area 522 by the effect of the random shift, it may develop a crosstalk between the layers of the recording medium which has two recording layers on one side thereof. It is then contemplated for prevention that the overlap between the extension guard area 528 and the VFO area 522 is introduced while permitting no gap regardless of the random shift. Accordingly, the length of the extension guard area 528 has to be set with at least 15 data bytes or more. As the succeeding VFO area 522 consists sufficiently of 71 data bytes, its partial overlapping with the extension guard area 528 may hardly interrupt the reading of data (i.e., the synchronization with the reference clock signal for the playback action is ensured by the remaining of the VFO area 522). This allows the extension guard area 528 to be set with more than 15 data bytes. It is previously described that a wobble slip may happen during the continuous recording and cause the dislocation of the recording point by one wobble period. As one wobble period is equal to 7.75 (about 8) data bytes, the length of the extension guard area 528 is set with (15+8)=23 data bytes.

The length of the extension guard area 528 shown in FIG. 15 like the buffer area 537 is determined of 24 data bytes with a margin of one data byte.

It is now needed that the start of the recording cluster 541 shown on (e) in FIG. 15 is located at accuracy. The start of the recording is detected by wobble signals saved preliminarily on the data recording medium of either rewritable type or write once type according to the embodiment. As apparent from (d) in FIG. 14, the pattern is shifted from NPW to IPW at every 4 wobbles except the wobble sync area 580. The wobble sync area 580 however permits the wobble shift to occur partially not in every 4 wobbles and its location can thus be detected with much ease. In fact, the data record/playback apparatus first detects the location of the wobble sync area 580 and then prepares the steps of processing before starting the recording action. Accordingly, the recording cluster 541 has to be allocated in the non-modulation area 590 preceded directly by the wobble sync area 580.

This is illustrated in FIG. 16. The wobble sync area 580 is provided just after the end of the preceding physical segment. As shown in (d) in FIG. 14, the length of the wobble area 580 is 16 wobble periods. Another 8 wobble periods are also desired for providing a margin for the preparation after the detection of the wobble sync area 580. It is hence needed that the head of the VFO area 522 assigned at the beginning of the recording cluster 541 is allocated to a particular location distanced rearwardly by 24 or more wobbles from the end of the preceding physical segment for considering the random shift, as shown in FIG. 16.

As shown in FIG. 15, the recording action is repeated at the overlap 541 for the rewriting. The repeat of the recording action may modify (deteriorate) the physical configuration of the wobble groove or land hence declining the quality of the wobble playback signal. For compensation, the overlap 541 for the rewriting is inhibited from being in the wobble sync area 580 or the wobble address area 586 but stays in the non-modulation area 590 as shown (a) and (d) in FIG. 14. The non-modulation area 590 carries repeats of a wobble pattern (NPW). Accordingly, if the wobble playback signal reproduced from the non-modulation area 590 is degraded, it can be corrected by interpolation with the two, preceding and succeeding, adjacent wobble playback signals.

(Optical Head)

The optical head 11 has an optical sensor divided radially into two segments for producing a sum signal SS carrying the data information and a difference signal DS carrying the address data. The two signals are explained referring to FIG. 4. FIG. 4 illustrates the relationship between the track on the recording medium and the spot of the laser beam. The recording track on the optical medium according to the embodiment is slightly waved (wobbled) in the radial directions. The optical sensor in the optical head 11 is provided for detecting the reflection of the laser beam and particularly divided into two segments as shown (a) in FIG. 4. The two signals from the segments of the sensor are connected as shown on (b) in FIG. 4. As the sum signal SS corresponds in the signal level to the track width scanned by the spot of the laser beam, its signal level is determined by the crystalline condition of the optical disk D. The difference signal DS is determined by the waving (wobbling) of the recording track.

(Address Playback Circuit)

An address playback circuit shown in FIG. 1 will be explained in more detail, referring to FIG. 3.

As shown in FIG. 3, the address playback circuit 23 is connected for extracting the address data from a phase modulated form of the (wobble) difference signal DS. The output signal of the sensor or photo detector FD is transmitted to two amplifiers 33 and 34 of which the outputs are received by a comparator 32. The output signal of the comparator 32 is transferred as a wobble signal to a bandpass filter 35 in the address playback circuit 23. The wobble signal contains medium intrinsic noises and crosstalk noises derived from the neighbor tracks. For maintaining the frequencies of the wobble signal, such noises are removed by the bandpass filter (BPF) 35. The wobble signal separated from the noises is transmitted to a phase detector 36 and simultaneously to a phase locked loop circuit (PLL) 37 for generating a carrier wave. The PLL 37 operates a phase synchronizing action to produce the carrier wave synchronized with the wobble signal.

The phase detector 36 conducts a phase detecting action from the wobble signal and the synchronized carrier wave. In a typical type of the phase detecting action, the modulated wobble signal and the carrier wave are multiplied to determine the polarity of phase. The waveform after the multiplication is examined through offsetting between a first phase and a second phase. Resultant high-frequencies (of multiplied waves of the original) produced by the phase detection are removed by a lowpass filter (LPF) 38 or the like. The waveform after the LPF 38 is received by a slicer 39 where it is binarized through threshold detection. Now, a clock (referred to as a symbol clock hereinafter) synchronized with the address bits is needed for extracting the address data from the binary signal. The symbol clock is produced from the wobble clock signal synchronized with the wobble period and supplied from the PLL and the binary signal supplied from the slicer. More particularly, a symbol clock generator 40 is provided for having a waveform produced by 1/N frequency division of the wobble clock signal and synchronized with the binary signal. N is determined from the number of wobbles used to express one address bit. For example, when one address bit is composed of 4 wobbles, the binary signal is shifted in the polarity at every multiplication by 4 of the wobbles. The minimum of the modulation period is equal to 4 wobbles. Therefore, with N being set to 4, the clock synchronized with the address bit can be produced. The 1/N frequency wobble clock synchronized with the binary signal is then transferred to an address decoder 41. In the address decoder, the decoding of address data is carried out using the binary signal from the slicer and the symbol clock. It is however common that the modulated wobble signal carries not only the physical address data but also a sync signal which indicates the start of the address data. Also, the sync signal has been modulated at a frequency different from that of the address bits for discriminating the sync signal from the address data. The symbol clock is hence produced with a minimum modulation frequency including the sync signal. If the detection of the sync signal is carried out by a different manner (e.g., at every one wobble) from the detection of the address bits, the symbol clock can be matched with the minimum modulation frequency of the address bit.

By that manner, the address data can be extracted from the modulated wobble signal. Moreover, as there is the relationship of location (time) between the difference signal DS and the sum signal SS described referring to FIGS. 12 to 16 or being described below at the method of determining the timing, the succeeding ECC block explicitly starts just after 24 wobble cycles from the end of the seventh wobble segment in the current ECC block.

(Highpass Filter)

The highpass filter 14 will now be described. The highpass filter 14 is a frequency variable HPF which can change its cutoff frequency and can be implemented by any known technique. As shown in FIG. 8, the highpass filter 14 in the embodiment comprises a capacitor 51, a gm amplifier 52, an electric current source 53, and a buffer 54. The capacitor 51 is connected at one end to an input port 55 of the filter circuit. The other end of the capacitor 51 is connected to an output of the gm amplifier 52 and an input of the buffer 54. The output of the buffer 54 is connected to an output port 56 of the filter and to an inverse (−) input of the gm amplifier 52. The non-inverse (+) input of the gm amplifier 52 is loaded with a reference voltage Vr.

It is assumed in the highpass filter 14 that the capacitance of the capacitor 51 is C and the trans-conductance of the gm amplifier 52 is 1/r. Then, the transmission function HPFout is expressed by $$HPFout = SCr/(1+SCr) \quad (1)$$

The cutoff frequency fc is calculated from $$fc = 1/2\pi Cr \quad (2)$$

When the current of the current source 53 is I, the trans-conductance 1/r of the gm amplifier 52 is expressed by KI (K being a constant). Accordingly, the cutoff frequency fc of the highpass filter 14 can controllably be determined by modifying the current I of the current source 53.

Preferably, the current I of the current source 53 may be modified by a band selector switch 17 selecting one or their combination from a group of different currents of discrete current sources.

As its circuitry arrangement shown in FIG. 8 is implemented as an example but not of limitation, the highpass filter 14 may be provided by any appropriate circuit which can control the cutoff frequency fc from the outside.

(Variable Gain Amplifier)

The variable gain amplifier (VGA) 16 will be explained in more detail. The variable gain amplifier 16 is designed for automatically controlling the gain to have a predetermined level of the amplitude of its output signal. Its time constant can desirably be determined from the outside. The variable gain amplifier 16 (VGA) may be implemented by any appropriate circuit which can favorably be controlled in the time constant from the outside.

(Band Controller and Band Selector Switch)

The band controller 20 will be explained. The band controller 20 is arranged responsive to a control signal from the data controller 29 for producing a band switching signal to be supplied to the band selector switch 17. The band controller 20 can determine at least three or more of the cutoff frequencies for the highpass filter 14 and the time constant for the variable gain amplifier 16. Accordingly, the band controller 20 has to be connected to the band selector switch 17 by the at least two (2 bit) or more digits control signal line.

The band selector switch 17 will now be described in more detail. The band selector switch 17 is arranged responsive to a control signal from the band controller 20 for switching the cutoff frequency of the highpass filter 14 and the time constant of the variable gain amplifier 16. More specifically, in response to the control signal from the band controller 20, the selector circuit modifies the current I of the current source 53 shown in FIG. 8. Either of the cutoff frequency and the time constant can be selected from at least three different settings.

(Transient Response in Non-Recorded and Recorded Areas)

This phenomenon is illustrated in FIG. 5. Shown on (a) in FIG. 5 shows an output signal from the optical head 11. The non-recorded area ends at the time 1.8 and is followed by the recording area. Shown on (b) in FIG. 5 is the output signal of the highpass filter (HPF) 14 having a fixed high passcutoff frequency. As apparent, the output signal is substantially zero before the time 1.8 and the transient response appears from the time 1.8. As the cutoff frequency of the highpass filter 14 is sufficiently low in the illustration, the transient response continues throughout a considerable length of time. During the presence of the transient response, the output signal of the highpass filter (HPF) 14 stays out of the dynamic range of the succeeding circuit including the variable gain amplifier 16 and the equalizer 15 thus causing malfunctions of the succeeding circuit.

A portion of (c) in FIG. 5 illustrates an output waveform of the playback signal shown in (a) in FIG. 5 when the technique disclosed in Patent Document 1 has been applied. The cutoff frequency is temporarily increased at the time 2.0 and decreased back to its original level about the time 2.01.

A portion of (d) in FIG. 5 is an enlargement of the waveform around the time 2.0 shown in (c) in FIG. 5. As apparent from (c) or (d) in FIG. 5, the DC level of the signal remains at zero while the cutoff frequency is increased but develops a transient response occurs when it is decreased to the original level. As a result, the malfunctions of the circuitry components at the subsequent stage will not be avoided. Even if the timing of decreasing the cutoff frequency to the original level is shifted, the waveform shown on (c) or (d) in FIG. 5 remains substantially unchanged but may not stay free from the transient response.

(Filtering Action of the Invention)

The filtering action corresponding to present invention will be described referring to FIG. 6.

A portion of (a) in FIG. 6 illustrates an output signal of the optical head 11 which is shifted at the time 1.8 from the non-record mode to the record mode.

A portion of (b) in FIG. 6 is the output signal of the highpass filter (HPF) 14 having a fixed cutoff frequency.

A portion of (c) in FIG. 6 illustrates a waveform of the playback signal shown on (a) in FIG. 6 filtered according to the embodiment of the present invention.

A portion of (d) in FIG. 6 shows an enlargement of the waveform around the time 2.0 illustrated on (c) in FIG. 6. As shown on (c) and (d) in FIG. 6, the cutoff frequency is increased to a maximum at the time 2.0 and decreased by one step about the time 2.003. For ease of the description, the duration of time by now is called period (T1). Then, the cutoff frequency is decreased again by one step about the time 2.01. The duration of time by now is called period (T2). Similarly, the cutoff frequency is decreased further by one step about the time 2.25. The duration of time by now is called period (T3). Finally, the cutoff frequency is returned back to its original level. As apparent from the result shown, unwanted portions of the DC component in the playback signal can be eliminated without generating any transient response by switching the cutoff frequency from one level to another in steps.

Thereby, the filtering action according to the present invention is implemented by at least a combination of the band controller 20, the band selector switch 17, and the highpass filter 14. More particularly, the band controller 20 supplies the band selector switch 17 in the RF amplifier 12 along the two or more digits signal control line with a control signal corresponding to the playback signal at a desired timing. In turn, the band selector switch 17 drives the highpass filter 14 to carry out at three or more consecutive filtering actions at the different cutoff frequencies during the three or more corresponding periods T1, T2, and T3 in the RF amplifier 12 acting as a filter circuit.

FIG. 7 illustrates the relationship between the playback signal shown in FIG. 6 and the cutoff frequency of the highpass filter 14 determined by the band controller 20 and the band selector switch 17. As shown, the output signal of the band controller 20 is released as a two-digits control signal FcCTL (1:0). These two control signals can determine 4 different levels of the cutoff frequency: from higher, Fc3, Fc2, Fc1, and Fc0. The level Fc0 of the cutoff frequency is commonly used during the normal playback action of data as set to a much lower level than the spectrum of the playback signal. The relationship between the output signal FcCTL (1:0) of the band controller 20 and the cutoff frequency Fc is as follows:

When FcCTL(1:0)="00", Fc=Fc0
When FcCTL(1:0)="01", Fc=Fc1
When FcCTL(1:0)="11", Fc=Fc2
When FcCTL(1:0)="10", Fc=Fc3.

More specifically, the band controller 110 changes output signals in suitable timing, thereby, it contains no transient response in the waveform.

(Method of Determining the Timing)

The method of determining the timing of the band controller 20 for releasing the control signal will now be described in more detail. In an example of above format of the optical disk, the data is recorded in units of the ECC block of 64 KB. As shown in FIG. 15, the guard area 433 which contains the VFO area 522 is provided between any two adjacent ECC blocks 411 and 412. When recording is carried out normally, the transition from non-recorded area to recorded area occurs in the VFO area 522. In the VFO area, DC components of the playback signal are significantly small. Accordingly, the above mentioned filtering action may preferably be conducted in the VFO area 522.

As described with FIG. 14, the difference signal DS carries the address data corresponding to the wobbles. There is a constant distance between the physical segment carrying the address data of the difference signal DS and the VFO area 522 in the sum signal SS as shown on (a) in FIG. 14 and FIG. 16. Hence, the relationship of location (time) is developed between the VFO area of the difference signal DS and the address of the sum signal SS.

The relationship of location (time) can be utilized by the address playback circuit precisely detecting the VFO area from the difference signal DS and the sun signal SS.

It is possible to get the present address data from the difference signal DS or modulated wobble signal in case of the pre described optical disk format.

Also, since the relationship of location (time) between the difference signal DS and the sum signal SS exists, the start of data in the succeeding ECC block is explicitly preceded by 24 wobbles cycles from the end of the seventh wobble segment in the current ECC block as shown in FIG. 16. The ECC block is sandwiched at the start and end between the VFO areas 522(471) as shown in FIG. 13. This allows the VFO area 522(471) to be identified by the data controller 29 detecting the output signal of the address playback circuit 23. As the playback action of binary data is not needed for the VFO area 522(471), the band controller 20 can release the control signal regardless of the presence of the non-recorded area for switching the cutoff frequency as shown in FIG. 7. The periods shown in FIG. 7 can also be set to optimum lengths depending on the playback channel rate and the cutoff frequency Fc and their settings may be registered in the band controller 20.

The disk drive apparatus of the present invention can absorb any unwanted change in the DC component of the playback signal readily and smoothly, thus permitting no malfunctions of the succeeding components at the downstream. Even if the playback speed is varied, for example, in a double-speed playback mode, the cutoff frequency and its applying duration of time can correspondingly be modified by the present invention, thus permitting no fault action. Also, when the recording medium such as a DVD-RAM is not uniform in the recording format or linear speed, the action of the succeeding components or circuits can be ensured without malfunctions by correspondingly modifying the cutoff frequency and its applying duration of time.

Second Embodiment

The second embodiment of the present invention is developed for increasing the cutoff frequency f1 during the period T1 to a extremely higher level than the spectrum of the playback signal at the normal mode. This is possible because the playback of binary data in the VFO areas is not needed as described previously. The playback action will hardly be affected when the cutoff frequency is increased enough to lower the amplitude of the signal to almost zero throughout the period T1.

Accordingly, the highpass filter 14 is modified to an arrangement shown in FIG. 9. Like components in FIG. 9 are denoted by like numerals as those shown in FIG. 8. The arrangement of FIG. 9 is differentiated from that of FIG. 8 by a switch 57. The switch 57 is connected at one end to the capacitor 51 and at the other to the reference voltage Vr. When the switch 57 is closed, the output port 56 of the circuit remains at Vr regardless of the voltage level at the input port 55. At the period T1, the switch 57 is closed by the controlling action. This is equivalent to the current source 53 feeding a higher level of current. Then, by the same manner as of first embodiment, the cutoff frequency is decreased in steps by the band controller 20 switching the output signal from one to another at desired timings.

FIG. 10 illustrates a waveform output of the highpass filter 14 in the second embodiment which receives the same input signal as of the first embodiment. As shown, the cutoff frequency Fc is gradually increased from Fc0 to Fc1, Fc2, and Fc3. Fc4 is the maximum cutoff frequency which is much higher than the spectrum of the output signal of the optical head 11. The cutoff frequency is set to Fc4 about the time 1.0 (period T1) and then declined with time to Fc3, Fc2, and Fc1 in steps. As the highpass filter 14 is set to a higher level of the cutoff frequency at the beginning, its output signal can instantly be zero regardless of a difference in the DC level or the playback speed. Accordingly, an unwanted portion of the DC component or a transient response can be eliminated at a higher efficiency than that of the first embodiment. Also, since the cutoff frequency is selectively switched simply by the switch 57, the band controller 20 can be simplified in the arrangement.

Third Embodiment

The third embodiment shows that present invention is used for absorption of change of direct current component caused by media defect. As described previously, the defect detector 19 is provided for detecting a defect in the playback signal (a defect signal). In general, such a defect signal carries undesired level portions of the DC component. The undesired portion of the DC component in the defect signal may cause a transient response in the highpass filter 14 thus disturbing the playback action even after the defect signal is terminated. It is hence needed to eliminate the unwanted portion of the DC component immediately after the defect signal is terminated.

As shown in FIG. 2, the defect detector 19 produces and releases an output signal of "H" level upon detecting a defect signal.

Here, the arrangement of the defect detector 19 is known as disclosed in Jpn. Pat. Appln. KOKAI Publication No. 2003-157528 or any other related art. A counter 51 has both functions of counting up and down, where the counting up starts when a defect signal is detected and the counting down is carried out when not at the defect detector 19. A group of comparators 52, 53, and 54 are provided for comparing an output of the counter 51 with their respective thresholds before feeding an OR circuit 101 with their results. The OR circuit 101 also receives a control signal from the data controller 29 and releases a band control signal TS to the band selector switch 17.

When the output of the counter 51 is between the first threshold Fc0 and the second threshold Fc1, the control signal modifies the cutoff frequency of the highpass filter 14 to Fc1. When the output of the counter 51 is between the second threshold Fc1 and the third threshold Fc2, the control signal modifies the cutoff frequency of the highpass filter 14 to Fc2. When the output of the counter 51 is between the third threshold Fc2 and the fourth threshold Fc3, the control signal modifies the cutoff frequency of the highpass filter 14 to Fc3. When the output of the counter 51 is lower than the first threshold Fc0, the control signal adjusts the cutoff frequency of the highpass filter 14 to Fc0.

According to the described arrangement, the cutoff frequency of the highpass filter 14 remains high when the defect signal is continued to readily attenuate the unwanted portions of the DC component. When the defect mode is terminated, the cutoff frequency of the highpass filter 14 is then declined to return to the normal mode of the playback action. The returning to the normal mode of the playback action can more favorably be conducted by optimizing the ratio between the counting up and the counting down and setting the comparators 52, 53, and 54 with optimum thresholds.

FIG. 11 illustrate the playback signal according to the third embodiment. A portion of (a) in FIG. 11 shows a waveform of the output signal of the optical head 11 which contains a defect. The defect is an unwanted change in the DC level extending substantially from the time 5000 to the time 10000. A portion of (b) in FIG. 11 shows a waveform of the output signal of the highpass filter 14 according to the embodiment. The signal is momentarily disturbed about the time 5000 and the time 10000 but quickly returned to the normal shape. A portion of (c) in FIG. 11 shows an enlargement of the waveform about the time 5000 shown on (b) in FIG. 11. A portion of (d) in FIG. 11 is a graphic diagram showing a change with time of the cutoff frequency shown on (c) in FIG. 11.

As apparent from the diagram, the cutoff frequency is gradually increased to Fc1, Fc2, and Fc3 in response to the generation of a defect. As unwanted portions of the DC component in the output signal of the highpass filter are attenuated to eliminate the defect, its cutoff frequency is declined in steps.

The method of determining the length of periods for modulation of the cutoff frequency according to the first and second embodiments will now be explained in relation to the format of a recording medium. It is assumed that the cutoff frequency of the highpass filter is Fc (Hz) and the a difference in the amplitude of the DC component is Vc. The transient response is 1/Fc seconds until the DC component in the output signal of the highpass filter drops down to lower than Vc*0.63. It is hence desired that the periods T1, T2, and T3 for application of the different levels of the cutoff frequency are 1/Fc or higher in the time constant. More specifically, the period T1 is longer than 1/Fc1, the period T2 is longer than 1/Fc2, and the period T3 is longer than 1/Fc3 in the setting.

When the cutoff frequency Fc is higher than its normal level, the reproduction of a binary data from the RF playback signal will hardly be ensured. As described previously with the first embodiment, the cutoff frequency is increased only in the VFO area where the DC component in the playback signal is less and the reproduction of binary data is not needed.

It is hence necessary to have the length of the VFO area longer than a sum of the periods for the higher levels of the cutoff frequency. More particularly, the VFO shown in FIG. 7 has to be extend through a duration of not shorter than a sum of T1+T2+T3 or (1/Fc1+1/Fc2+1/Fc3). The optical disk apparatus with the highpass filter according to the present invention is hence adapted in that the duration of playback of the VFO area is equal to at least a sum of T1+T2+T3. Alternatively, when the optical disk apparatus remains unmodified, the format of a disk has to set the VFO area to the length of T1+T2+T3.

As set forth above, the highpass filter according to the present invention can readily absorb an unwanted difference in the DC level of the playback signal which is abruptly encountered during he playback action. Accordingly, using the highpass filter of the present invention, a gap between two consecutive ECC blocks can be minimized.

Since the highpass filter of the present invention is favorably modified in the cutoff frequency and its applying period, its filtering action can readily eliminate any unwanted change in the DC level of the playback signal regardless of the type of recording format or the playback speed. Moreover, any defect signal which appears irregularly can successfully be corrected by eliminating its unwanted DC levels.

It would be understood that the forgoing embodiments are easily implemented by those skilled in the art and their changes and modifications are also possible as feasible by those skilled in the art while applicable to other systems with no inventive features. The present invention is not limited to the foregoing embodiments but covers a large range of implementations not departing from its disclosed principles and novel features.

What is claimed is:

1. An optical disk drive apparatus comprising:
   a reading section which reads the reflection of a laser beam from a disk to produce a read signal;
   a filter section which filters the read signal with the use of three or more different cutoff frequencies upon receiving a control signal from a two or more bits signal line;
   a reproducing section which playbacks the read signal filtered by the filter; and
   a control section which provides the filter with the control signal along the two or more bits control line so that the filtering action with the three or more different cutoff frequencies of the filter is carried out throughout three or more consecutive periods respectively.

2. A disk drive apparatus according to claim 1, wherein the control section is arranged to have a sum of the three or more consecutive periods arranged shorter than the duration of the reproducer for processing an area on the disk where a given period signal is recorded.

3. A disk drive apparatus according to claim 1, wherein the control section is arranged to provide the filter with the control signal along the two or more bits control line upon detecting a defect in the read signal so that the filtering action with the three or more different cutoff frequencies of the filter is carried out throughout three or more consecutive periods respectively.

4. A drive apparatus according to claim 1, wherein the control section is arranged to set the first cutoff frequency among the three different cutoff frequencies of the filter to such a higher level that the output signal of the filer is attenuated to zero.

5. A disk playback method comprising:
   reading the reflection of a laser beam from a disk to produce a read signal;
   filtering the read signal with the use of three or more different cutoff frequencies in response to a control signal received from a two or more bits control line;
   playing back the read signal filtered by the filter; and
   providing the filter with the control signal along the two or more bits control line so that the filtering action with the three or more different cutoff frequencies of the filter is carried out throughout three or more consecutive periods respectively.

6. A disk playback method according to claim 5, further comprising:
   having a sum of the three or more consecutive periods arranged shorter than the duration of the reproducer for processing an area on the disk where a given period signal is recorded.

7. A disk playback method according to claim 5, further comprising:
   providing the filter with the control signal along the two or more bits signal line in response to detection of a defect in the read signal so that the filtering action with the three or more different cutoff frequencies of the filter is carried out throughout three or more consecutive periods respectively.

8. A disk playback method according to claim 5, further comprising:
   setting the first cutoff frequency among the three different cutoff frequencies of the filter to such a higher level that the output signal of the filer is attenuated to zero.

* * * * *